(12) United States Patent
Nomoto et al.

(10) Patent No.: US 8,207,242 B2
(45) Date of Patent: Jun. 26, 2012

(54) PROCESS FOR PRODUCING PHOTOCURABLE MATERIAL, PHOTOCURABLE MATERIAL AND ARTICLE

(75) Inventors: Hideo Nomoto, Tokyo (JP); Yasuhide Kawaguchi, Tokyo (JP); Hideshi Sasakura, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 13/152,740

(22) Filed: Jun. 3, 2011

(65) Prior Publication Data

US 2011/0237703 A1    Sep. 29, 2011

Related U.S. Application Data

(63) Continuation of application No. PCT/JP2009/070917, filed on Dec. 15, 2009.

(30) Foreign Application Priority Data

Dec. 15, 2008  (JP) .................................. 2008-318895
Jul. 1, 2009   (JP) .................................. 2009-157257

(51) Int. Cl.
C08J 3/28     (2006.01)
B32B 5/16     (2006.01)
B05D 3/00     (2006.01)
C08G 79/00    (2006.01)
C08F 20/06    (2006.01)

(52) U.S. Cl. ........ 522/120; 522/132; 428/405; 428/457; 428/500; 427/553; 427/558; 528/9; 528/10; 526/317.1; 977/773; 977/778

(58) Field of Classification Search .................. 522/120, 522/132; 428/405, 457, 500; 427/553, 558; 528/9, 10; 526/317.1; 977/773, 778

See application file for complete search history.

(56) References Cited

U.S. PATENT DOCUMENTS

| 6,696,220 B2 | 2/2004 | Bailey et al. | |
| 7,252,883 B2 * | 8/2007 | Wakiya et al. | 428/403 |
| 2010/0178512 A1 * | 7/2010 | Giesenberg et al. | 428/405 |

FOREIGN PATENT DOCUMENTS

| JP | 2004-71934 | 3/2004 |
| JP | 2006-182880 | 7/2006 |
| JP | 2006-273709 | 10/2006 |
| JP | 2007-314773 | * 12/2007 |
| JP | 2008-156479 | 7/2008 |
| JP | 2008-163252 | 7/2008 |
| JP | 2008-201853 | 9/2008 |

OTHER PUBLICATIONS

Ueno et al.; machine English translation of JP 2007-314773.*
International Search Report issued Feb. 23, 2010 in PCT/JP09/070917 filed Dec. 15, 2009.
Polymer Reprints, Japan vol. 57, No. 2 (2008) p. 3480-3481.

* cited by examiner

*Primary Examiner* — Mark Eashoo
*Assistant Examiner* — Jessica Paul
(74) *Attorney, Agent, or Firm* — Oblon, Spivak, McClelland, Maier & Neustadt, L.L.P.

(57) ABSTRACT

To provide a photocurable material which can form a cured product having a high transparency and a high refractive index, a process for producing the material easily, and an article having a high transparency and a high refractive index. The photocurable material is obtained by a production process comprising (i) a step of reacting a polymerizable component (A) comprised of at least one type of a compound (a) having a (meth)acryloyloxy group, and a compound (B) having a mercapto group and a carboxy group to obtain a surface modifier (C) which has the carboxy group derived from the compound (B) at a terminal, (ii) a step of modifying the surface of inorganic fine particles (D) with the surface modifier (C) to obtain surface-modified inorganic fine particles (E), and (iii) a step of obtaining a photocurable material which contains the surface-modified inorganic fine particles (E), a polymerizable component (F) comprised of at least one type of a compound (f) having a (meth)acryloyloxy group, and a photopolymerization initiator (G).

15 Claims, 1 Drawing Sheet

PROCESS FOR PRODUCING PHOTOCURABLE MATERIAL, PHOTOCURABLE MATERIAL AND ARTICLE

TECHNICAL FIELD

The present invention relates to a process for producing a photocurable material, the photocurable material obtained by the production process and an article obtained by using the photocurable material.

BACKGROUND ART

In the production of optical components, recording media, semiconductor devices, etc., as a method for forming a fine pattern in a short time, a method for forming a fine pattern on the surface of a substrate (nanoimprinting method) is known wherein a mold having on its surface a reverse pattern of such a fine pattern, is pressed to a photocurable material placed on the surface of a substrate, and the photocurable material is irradiated with light to cure the photocurable material thereby to form a fine pattern on the surface of the substrate (Patent Documents 1 and 2).

Meanwhile, in an application to an optical component (such as a lens array or a photonic crystal), the refractive index may sometimes be required to be at least 1.54. Therefore, a cured product of the photocurable material may also be required to have a high refractive index.

As a means to increase the refractive index, dispersing inorganic fine particles having a higher refractive index than an organic material in a photocurable material has been considered.

As a method of dispersing the inorganic fine particles in the photocurable material, a method of modifying the surface of the inorganic fine particles with a compound having a high affinity to the photocurable material has been known (Patent Document 3).

However, while the inorganic fine particles obtained by such a method have a good dispersibility in the photocurable material before curing, they are extruded at the time of curing the photocurable material, and then the extruded inorganic fine particles are precipitated or agglomerated, whereby the transparency of the cured product is impaired.

As a method of maintaining dispersion of the inorganic fine particles also at the time of curing the photocurable material, a method wherein inorganic fine particles modified with a compound having a high affinity are additionally modified with a compound having the same reaction site as the photocurable material is known (Patent Document 4).

The inorganic fine particles modified by such a method, have the same reaction site as the photocurable material, whereby they are fixed in the cured product in a dispersed state as is at the time of curing the photocurable material. However, a compound modifying the inorganic fine particles becomes bulky in such a method, whereby there are problems such that a refractive index as designed is not obtained and the refractive index decreases, etc.

To introduce a reaction site with a photocurable material, a method of modifying inorganic fine particles with acrylic acid has been suggested (Non-Patent Document 1).

Since acrylic acid has a low molecular weight, a compound modifying inorganic fine particles is not bulky, and therefore it seems to be a good method. However, when only acrylic acid is used, the polarity of the surface of the inorganic fine particles cannot be sufficiently covered, whereby the inorganic fine particles modified with acrylic acid have a relatively high polarity. Therefore, the following problems are caused.

(1) Since inorganic fine particles are, usually, provided as an aqueous sol, inorganic fine particles modified with acrylic acid are required to be extracted from the aqueous sol by using an organic solvent, before they are added to the photocurable material. However, the inorganic fine particles modified with acrylic acid are dispersible only in an organic solvent having a relatively high polarity (such as methanol). Therefore, filtration, solvent displacement, etc. are required before extraction, whereby steps increase.

(2) Further, the photocurable material as an object of dispersion is also limited to one having a relatively high polarity (such as a non-fluorinated (meth)acrylate).

When inorganic fine particles are to be dispersed in a photocurable material having a high hydrophobicity and containing a fluoro(meth)acrylate, a fluorinated surfactant, etc. it is required to impart an affinity to the photocurable material to the inorganic fine particles while suppressing bulkiness of a compound modifying the inorganic fine particles, and further introduce a reaction site with the photocurable material. However, as described above, by conventional methods, it is difficult to impart an affinity to the photocurable material to the inorganic fine particles while suppressing bulkiness of a compound modifying the inorganic fine particles, and further introduce a reaction site with the photocurable material.

PRIOR ART DOCUMENTS

Patent Documents

Patent Document 1: U.S. Pat. No. 6,696,220
Patent Document 2: JP-A-2004-071934
Patent Document 3: JP-A-2007-314773
Patent Document 3: JP-A-2008-201853

Non-Patent Document

Non-Patent Document 1: "Preparation of a nanocomposite of high refractive index thioacrylate resin/$TiO_2$-$ZrO_2$ ultrafine particles and its characterization", Polymer Preprints, Japan, Vol. 57 (2), 2008, p. 3480-3481

DISCLOSURE OF INVENTION

Technical Problem

The present invention is to provide a photocurable material which can form a cured product having a high transparency and a high refractive index, a process for producing the material easily, and an article having a high transparency and a high refractive index.

Solution to Problem

The process for producing the photocurable material of the present invention comprises the following steps (i) to (iii).

(i) a step of reacting a polymerizable component (A) comprised of at least one type of a compound (a) having a (meth)acryloyloxy group, and a compound (B) having a mercapto group and a carboxy group to obtain a surface modifier (C) which has the carboxy group derived from the compound (B) at a terminal, (ii) a step of modifying the surface of inorganic fine particles (D) with the surface modifier (C) to obtain surface-modified inorganic fine particles (E), (iii) a step of obtaining a photocurable material which contains the surface-modified inorganic fine particles (E), a polymerizable component (F) comprised of at least one type of a compound (f) having a (meth)acryloyloxy group, and a photopolymerization initiator (G).

The molar amount of the polymerizable component (A) in the step (i) is preferably from 0.5 to 10 times of the molar amount of the compound (B).

The mass of the inorganic fine particles (D) in the step (ii) is preferably from 0.2 to 10 times of the mass of the compound (B) used in the step (i).

Further, as represented by the proportions of the starting materials charged, in the total (100 mass %) of the polymerizable component (A), the compound (B), the inorganic fine particles (D), the polymerizable component (F) and the photopolymerization initiator (G), it is preferred that the total of the polymerizable component (A) and the polymerizable component (F) is from 10 to 98.8 mass %, the compound (B) is from 0.01 to 28 mass %, the inorganic fine particles (D) are from 0.1 to 75 mass % and the photopolymerization initiator (G) is from 0.1 to 9 mass %.

It is preferred that the compound (B) has a pKa of at most 4.4.

It is preferred that the compound (B) satisfies the following conditions (1) to (3).
condition (1): having, at least one mercapto group.
condition (2): having at least one carboxy group.
condition (3): having no primary amino group.

It is preferred that the compound (B) is a compound which is a $C_{2-20}$ aliphatic carboxylic acid, and has a mercapto group at least at any one of the α-, β- and γ-positions to the carboxy group, and no primary amino group.

It is preferred that the compound (B) has a molecular weight of at most 600.

It is preferred that the inorganic fine particles (D) are fine particles of a metal oxide.

It is preferred that the metal oxide is at least one member selected from the group consisting of titanium oxide, zirconium oxide, aluminum oxide, barium titanate, cerium oxide, tin oxide, zinc oxide, tantalum oxide, manganese oxide, nickel oxide, iron oxide, silicon oxide, niobium oxide, lanthanum oxide and gadolinium oxide.

It is preferred that the inorganic fine particles (D) have an average primary particle size of from 2 to 100 nm.

It is preferred that the polymerizable component (F) contains a compound (f2) having fluorine atoms and at least one (meth)acryloyloxy group.

It is preferred that the polymerizable component (F) contains a compound (f1) having at least two (meth)acryloyloxy groups (provided that the compound (f2) is excluded), the compound (f2) having fluorine atoms and at least one (meth)acryloyloxy group, and a compound (f3) having one (meth)acryloyloxy group (provided that the compound (f2) is excluded); and in the total (100 mass %) of the compound (f1), the compound (f2) and the compound (f3), the compound (f1) is from 15 to 70 mass %, the compound (f2) is from 5 to 45 mass % and the compound (f3) is from 10 to 65 mass %.

It is preferred that the polymerizable component (A) is comprised of at least one type of the compound (f) constituting the polymerizable component (F).

It is preferred that the polymerizable component (A) is a polymerizable component identical to the polymerizable component (F).

The photocurable material of the present invention is characterized in that it is obtained by the production process of the present invention.

It is preferred that the photocurable material of the present invention contains substantially no solvent.

The article of the present invention is characterized in that it is obtained by curing the photocurable material of the present invention, or comprised of a substrate and a cured film formed on the surface of the substrate by curing the photocurable material of the present invention.

Advantageous Effects of Invention

By the production process for the photocurable material of the present invention, it is possible to easily produce a photocurable material which can form a cured product having a high transparency and a high refractive index.

The photocurable material of the present invention can form a cured product having a high transparency and a high refractive index.

The article of the present invention has a high transparency and a high refractive index.

DESCRIPTION OF EMBODIMENTS

Figure 1:
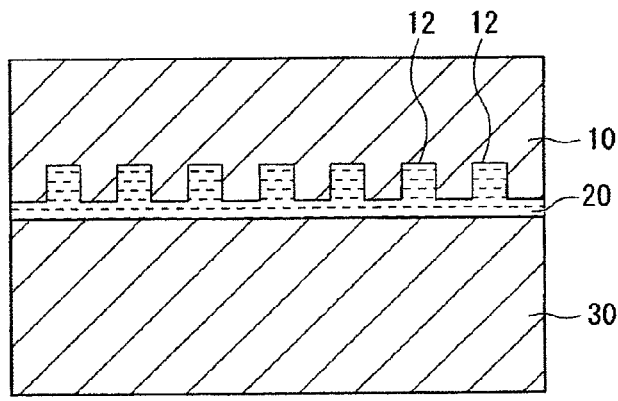
FIG. 1 is a cross-sectional view illustrating an embodiment of the process for producing a molded product having a fine pattern on its surface.

In the present specification, a compound represented by formula (f2) will be referred to as compound (f2). Compounds represented by other formulae will also be referred to in the same manner. Further, in the present specification, a (meth)acryloyloxy group means an acryloyloxy group or a methacryloyloxy group. Further, in the present specification, a (meth)acrylate means an acrylate or a methacrylate.

<Process for Producing Photocurable Material>

The process for producing a photocurable material of the present invention comprises the following steps (i) to (iii).

(i) a step of reacting a polymerizable component (A) comprised of at least one type of a compound (a) having a (meth)acryloyloxy group, and a compound (B) having a mercapto group and a carboxy group to obtain a surface modifier (C) which has the carboxy group derived from the compound (B) at a terminal, (ii) a step of modifying the surface of inorganic fine particles (D) with the surface modifier (C) to obtain surface-modified inorganic fine particles (E), (iii) a step of obtaining a photocurable material which contains the surface-modified inorganic fine particles (E), a polymerizable component (F) comprised of at least one type of a compound (f) having a (meth)acryloyloxy group, and a photopolymerization initiator (G).

Step (i):

The step (i) is a step of reacting the polymerizable component (A) and the compound (B) to obtain the surface modifier (C) which has the carboxy group derived from the compound (B) at a terminal.

(Polymerizable Component (A))

The polymerizable component (A) is a polymerizable component comprised of at least one type of a compound (a).

The compound (a) is a compound having a (meth)acryloyloxy group, and may be a compound identical to a compound exemplified as the below-mentioned compound (f).

The polymerizable component (A) is preferably a polymerizable component comprised of at least one type of compound (f) constituting the below-mentioned polymerizable component (F), more preferably a polymerizable component identical to the polymerizable component (F), in view of dispersibility of the surface-modified inorganic fine particles (E) in the polymerizable component (F). The identical polymerizable component means that the type(s) and content(s) of the compound(s) are identical.

(Compound (B))

The compound (B) is a compound having a mercapto group and a carboxy group.

The mercapto group reacts with a carbon-carbon unsaturated double bond of the (meth)acryloyloxy group of the polymerizable component (A). As a result, the surface modifier (C) will be obtained which has the carboxy group derived from the compound (B) capable of binding to the inorganic fine particles (D), and has a structure derived from the polymerizable component (A) which becomes a reaction site to the polymerizable component (F) and has a high affinity to the polymerizable component (F). Further, a mercapto group which is unreacted in the step (i) may become a reaction site to the polymerizable component (F).

The mercapto group may be protected by a protecting group. In such a case, it may be reacted with the polymerizable component (A) after removing the protecting group, or under a deprotection condition. The protecting group may be a known protecting group such as a trityl group, a benzyl group or a disulfide bond.

The number of carboxy groups in the compound (B) may be one, or more than one. The number is preferably two in a case where the number is more than one.

It is preferred that the compound (B) has a pKa of at most 4.4. In the present invention, the inorganic fine particles (D) are modified by using the surface modifier (C) having the carboxy group derived from the compound (B) at a terminal to obtain the surface-modified inorganic fine particles (E). At that time, it is preferred that the carboxy group of the surface modifier (C) is sufficiently released. When the pKa of the compound (B) is at most 4.4, the carboxy group of the surface modifier (C) will be sufficiently released, whereby modification of the inorganic fine particles (D) will proceed smoothly. The lower limit of the pKa of the compound (B) is not particularly limited, but it is preferably −2, particularly preferably 0, from the viewpoint of types of usually available compounds and durability of the cured product of the photocurable material obtained by the present invention, etc. Therefore, the range of the pKa of the compound (B) is preferably from −2 to 4.4, particularly preferably from 0 to 4.3.

Further, the pKa of the compound (B) of the present invention is a value calculated from a measured value of the pH of the aqueous solution of the compound (B) at 20° C.

The compound (B) is preferably a compound which satisfies the following conditions (1) to (3) from the viewpoint of the binding property of the surface modifier (C) to the inorganic fine particles (D) and the dispersibility of the surface-modified inorganic fine particles (E) in the polymerizable component (F).

Condition (1): having at least one mercapto group.
Condition (2): having at least one carboxy group.
Condition (3): having no primary amino group.

The carboxy group derived from the compound (B) binds to the surface of the inorganic fine particles (D). When the carboxy group is sufficiently released, it becomes easier to bind to the surface of the inorganic fine particles (D). Therefore, the compound (B) may have substituents to adjust the acidity of the carboxy group.

The type and number of substituents and sites to be substituted in the compound (B) may be adjusted to maintain the acidity so that the carboxy group in the compound (B) (i.e. the carboxy group in the surface modifier (C)) can bind to the surface of the inorganic fine particles (D).

The substituents may, for example, be the following functional groups or ones having such functional groups.

An N-acylamino group such as an N-acetylamino group, a secondary amino group, a tertiary amino group, a quaternary ammonium group, an imino group, a halogen atom, an alkoxy group, a hydroxy group, a formyl group, a keto group, a carboxy group, an acid chloride, an ester group, an amido group, a cyano group, a nitroso group, a nitro group, an alkenyl group, an alkynyl group, an aryl group, a phenyl group, a cycloalkyl group, a heterocyclic group, a thioether group, a mercapto group, a sulfonyl group, Fmoc (9-fluorenylmethyloxycarbonyl) group, etc.

Among them, substituents which are generally supposed to have an electron-withdrawing property such as a halogen atom, a keto group, a carboxy group, a cyano group and a nitro group are preferred, and may be combined with groups which are generally supposed to have an electron-donating property within such a range that the carboxy group of the compound (B) can take an appropriate released state for modification of the inorganic fine particles (D), depending on the combination of other substituents and an N-acylamino group, and the sites for substitution, etc.

Further, in a case where the substituent is a mercapto group, it is possible to say that the condition (1) is satisfied by the mercapto group.

Further, it is preferred that the compound (B) has no primary amino group. If a primary amino group is contained, the inorganic fine particles (D) are likely to be agglomerated in the step (ii). Further, the primary amino group causes coloration since it reacts with the carboxy group with the lapse of time.

Further, the compound (B) is preferably a compound which is a $C_{2-20}$ aliphatic carboxylic acid, and has a mercapto group at least at any one of the α-, β- and γ-positions to the carboxy group, and no primary amino group. Here, the number of carbon atoms means a number which includes the carbon atom in the carboxy group (—COOH).

The structure of a portion of the aliphatic carboxylic acid excluding the carboxy group may be a linear structure or a branched structure. Further, the portion may contain an unsaturated bond. The portion is preferably an aliphatic saturated hydrocarbon group having a linear chain or branched structure. Further, the aliphatic carboxylic acid may have substituents, as described above. The compound (B) is also preferably a cysteine derivative in which an amino group is substituted with an acyl group.

The molecular weight of the compound (B) is preferably at most 600, more preferably at most 400. If the molecular weight exceeds 600, while the affinity to the polymerizable component (A), the polymerizable component (F) and an organic solvent will be increased due to a long chain alkyl group, etc., the optical properties which are supposed to be obtained from the optical properties of the polymerizable component (A) and the polymerizable component (F), and the optical properties of the inorganic fine particles (D) may not bring a result as designed, or may be likely to have a lower refractive index than as desired, since the molecules become bulky. Further, due to the growth of the portion which does not contribute to the binding property to the inorganic fine particles (D) and the affinity to the polymerizable component (F), the dispersion stability in the extract of the surface-modified inorganic fine particles (E) obtained in the step (ii) and the agglomeration suppression effect at the time of subjecting the photocurable material to photocuring, are impaired.

The compound (B) may be the following compounds. The molecular weight of each compound is shown in brackets. The mercapto group of each compound may be protected by a protecting group, and the compounds may be bonded to each other by a disulfide bond. Further, each compound may have substituents.

N-acetylcysteine (163.2),
N-propionylcysteine (177.2),
N-butanoylcysteine (191.3),
N-hexanoylcysteine (219.3),
N-octanoylcysteine (247.4),
N-decanoylcysteine (275.4),
N-dodecanoylcysteine (303.5),
N-tetradecanoylcysteine (331.5),
N-hexadecanoylcysteine (359.6),
N-octadecanoylcysteine (387.6),
N-acetylhomocysteine (177.2),
acetylamino mercaptoacetic acid (149.2),
Fmoc-cysteine (343.4),
Fmoc-S-tritylcysteine (585.7),
Fmoc-S-benzylcysteine (433.5),
N-methylcysteine (135.2),
N,N-dimethylcysteine (149.2),
2-ethylamino-3-mercaptopropionic acid (149.2),
2-propylamino-3-mercaptopropionic acid (163.2),
thioglycolic acid (92.1),
2-mercaptopropionic acid (106.1),
2-mercaptobutyric acid (120.2),
2-mercapto-3-methylbutyric acid (134.2),
2-mercaptopentanoic acid (134.2),
2-mercapto-3-methylpentanoic acid (148.2),
2-mercapto-4-methylpentanoic acid (148.2),
2-mercaptohexanoic acid (148.2),
2-mercapto-3-methylhexanoic acid (162.3),
2-mercaptoheptanoic acid (162.3),
2-mercaptooctanoic acid (176.3),
2-mercaptononanoic acid (190.3),
2-mercaptodecanoic acid (204.3),
2-mercaptoundecanoic acid (218.4),
2-mercaptododecanoic acid (232.4),
2-mercaptotetradecanoic acid (260.4),
2-mercaptohexadecanoic acid (288.5),
2-mercaptooctadecanoic acid (316.5),
2,3-dimercaptopropionic acid (138.2),
2,3-dimercaptosuccinic acid (188.2),
2-fluoro-3-mercaptopropionic acid (124.1),
2-chloro-3-mercaptopropionic acid (140.6),
2-bromo-3-mercaptopropionic acid (185.0),
2-iodo-3-mercaptopropionic acid (232),
2-hydroxy-3-mercaptopropionic acid (122.1),
2-hydroxy-4-mercaptobutyric acid (136.2),
2-phenyl-3-mercaptopropionic acid (182.2),
3-acetylamino-3-mercaptopropionic acid (163.2),
N-methoxycarbonyl cysteine (179.2),
N-ethoxycarbonyl cysteine (193.2),
N-carboxy cysteine (165.2),
3-mercaptopropionic acid (106.1),
3-mercaptobutyric acid (120.2),
3-mercapto-2-methylbutyric acid (134.2),
3-mercaptopentanoic acid (134.2),
3-mercapto-4-methylpentanoic acid (148.2),
3-mercaptohexanoic acid (148.2),
3-mercaptononanoic acid (190.3),
3-mercaptodecanoic acid (204.3),
2-mercaptosuccinic acid (150.2),
2-mercaptomethylsuccinic acid (164.2),
2-mercaptomalonic acid (136.1),
3-hydroxy-4-mercaptobutyric acid (136.2),
2-mercaptobenzoic acid (154.2),
3-mercaptobenzoic acid (154.2),
4-mercaptobenzoic acid (154.2),
tetrafluoro-4-mercaptobenzoic acid (226.15),
2-mercaptomethylbenzoic acid (168-2),
3-mercaptomethylbenzoic acid (168.2),
4-mercaptomethylbenzoic acid (168.2),
2-mercaptophenylacetic acid (168.2),
3-mercaptophenylacetic acid (168.2),
4-mercaptophenylacetic acid (168.2),
2-mercaptomethylphenylacetic acid (182.2),
3-mercaptomethylphenylacetic acid (182.2),
4-mercaptomethylphenylacetic acid (182.2),
α-mercaptomethylphenylacetic acid (182.2), etc.

(Surface Modifier (C))

The surface modifier (C) is obtained by reacting the polymerizable component (A) and the compound (B).

The reaction is a reaction between the carbon-carbon unsaturated double bond of the (meth)acryloyloxy group of the polymerizable component (A) and the mercapto group of the compound (B) i.e. an ene-thiol reaction.

The reason for reacting the polymerizable component (A) and the compound (B) is as follows.

To stably disperse an inorganic material having no affinity to an organic material in an organic material, it is ideal to modify the surface of the inorganic material with the organic material. In the step (i), to bring the surface close to such an ideal state, the polymerizable component (A) identical to the polymerizable component (F) in which the inorganic fine particles (D) are to be dispersed, is reacted with the compound (B) to introduce a carboxy group which can bind to the inorganic fine particles (D). As a result, in the step (ii), it becomes possible to introduce a structure derived from the polymerizable component (A) having a high affinity to the polymerizable component (F) to the surface of the inorganic fine particles (D), in a state wherein the existence of a third component other than the polymerizable component (A) and the inorganic fine particles (D) is reduced as much as possible.

The reaction is conducted by e.g. dissolving the compound (B) in an organic solvent, and adding the polymerizable component (A) and a photopolymerization initiator thereto, followed by irradiation with light.

The reaction is not required to proceed completely, and an unreacted material may be remained. Further, the compound (B) may be reacted to a terminal of the polymer obtained by polymerization of a portion of the polymerizable component (A).

The molar amount of the polymerizable component (A) is preferably from 0.5 to 10 times, more preferably from 0.9 to 5 times, of the molar amount of the compound (B). If the molar amount of the polymerizable component (A) is less than 0.5 time of the molar amount of the compound (B), in the surface modifier (C), there is an increase in an amount of an unreacted compound (B) i.e. a surface modifier having an insufficient affinity to the polymerizable component (A) and the polymerizable component (F), whereby the inorganic fine particles (D) are likely to be agglomerated in the step (ii). If the molar amount of the polymerizable component (A) exceeds 10 times of the molar amount of the compound (B), there is a decrease in an relative amount of the carboxy group in the surface modifier (C), whereby the inorganic fine particles (D) are not extracted sufficiently in the step (ii).

The organic solvent may be one which can dissolve the polymerizable component (A), the compound (B) and the photopolymerization initiator, without reacting with them, and is preferably an organic solvent having a low solubility in water. In the organic solvent, it is preferred to dissolve the compound (B) within a range of from 10 to 200 mg/mL.

The photopolymerization initiator may be one identical to one exemplified as the below-mentioned photopolymerization initiator (G).

The amount of the photopolymerization initiator to be added is preferably from 0.1 to 5 parts by mass per 100 parts by mass of the total of the polymerizable component (A) and the compound (B).

The type of light may optionally be selected depending on the photopolymerization initiator, and an ultraviolet ray having a main wavelength of 365 nm may, for example, be mentioned.

The irradiation time with light may, for example, be from 1 minute to 3 hours in a case where the irradiation density is 10 mW.

The reaction in the step (i) may be carried out as divided into at least two stages.

Step (ii):

The step (ii) is a step of modifying the surface of the inorganic fine particles (D) with surface modifier (C) to obtain the surface-modified inorganic fine particles (E).

(Inorganic Fine Particles (D))

The inorganic fine particles (D) are preferably fine particles of a metal oxide.

The metal oxide may be an oxide of at least one type of metal selected from the group consisting of metals of Group IV of the periodic table, metals of Group XIII of the periodic table and metals of Group XIV of the periodic table.

The metals of Group IV of the periodic table may, for example, be Ti, Zr and Hf.

The metals of Group XIII of the periodic table may, for example, be Al, Ga and In.

The metals of Group XIV of the periodic table may, for example, be Si, Ge, Sn and Pb.

The metal oxide is preferably titanium oxide, zirconium oxide, aluminum oxide, barium titanate, cerium oxide, tin oxide, zinc oxide, tantalum oxide, manganese oxide, nickel oxide, iron oxide, silicon oxide, niobium oxide, lanthanum oxide or gadolinium oxide.

The average primary particle size of the inorganic fine particles (D) is preferably from 2 to 100 nm, more preferably from 4 to 60 nm. When the average primary particle size is at most 100 nm, it becomes possible to maintain transparency of the cured product in a visible light region. When the average primary particle size is at least 2 nm, it becomes possible to avoid an increase in the amount of the compound (B) to be required along with a growth in the total specific surface area of fine particles.

The average primary particle size of the inorganic fine particles (D) is measured by a dynamic scattering method in a state of dispersion.

Since fine particles of the metal oxide have a disrupted crystal structure on their surface, some or all of the fine particles of the metal oxide may become a hydroxide.

The inorganic fine particles (D) may be used as one type alone or in combination as a mixture of two or more types of them, or may be fine particles of a composite metal oxide comprised of two or more types of them.

The form of the inorganic fine particles (D) may, for example, be a powder or a dispersion (sol) wherein they are dispersed in a solvent (dispersion medium), and from the viewpoint of transparency of the cured product, it is preferably a dispersion, more preferably an aqueous dispersion having water as a main component of the solvent.

The concentration of the inorganic fine particles (D) in the aqueous dispersion is preferably from 1 to 35 mass %, more preferably from 2 to 20 mass %. If the concentration is too low, the extraction efficiency of the surface-modified inorganic fine particles (E) from the aqueous dispersion becomes low. If the concentration is too high, due to the mechanical stress applied at the time of extracting the surface-modified inorganic fine particles (E) from the aqueous dispersion, the inorganic fine particles (D) are likely to undergo agglomeration in the aqueous dispersion.

(Surface-Modified Inorganic Fine Particles (E))

The surface-modified inorganic fine particles (E) are obtained by modifying the surface of the inorganic fine particles (D) with the surface modifier (C). Such modification is carried out by e.g. mixing a solution wherein the surface modifier (C) is dissolved in an organic solvent having a low solubility in water and an aqueous sol of the inorganic fine particles (D), to extract the surface-modified inorganic fine particles (E) to the organic solvent.

The mass of the inorganic fine particles (D) is preferably from 0.2 to 10 times, more preferably from 0.67 to 10 times of the mass of the compound (B) used in the step (i). If the mass of the inorganic fine particles (D) exceeds 10 times of the mass of the compound (B) used in the step (i), it becomes impossible to sufficiently extract the inorganic fine particles (D), and the inorganic fine particles (D) which are remained after extraction are likely to undergo agglomeration. If the mass of the inorganic fine particles (D) is less than 0.2 time of the mass of the compound (B) used in the step (i), due to the surfactant effect of the remained surface modifier (C), the solution of the surface modifier (C) and the aqueous dispersion medium of the inorganic fine particles (D) are likely to undergo emulsification. Therefore, it becomes contrary to the purpose of incorporating the inorganic fine particles (D) by using the minimum amount of the surface modifier (C) to the amount of the polymerizable component (A) and the polymerizable component (F).

After extracting the inorganic fine particles (D), the aqueous solvent is removed by a known method such as decantation, separatory funneling or the like, thereby to obtain an extract of the surface-modified inorganic fine particles (E).

In a case where the extract contains water, it is possible to further remove water incorporated in the extract by adding an organic solvent having a high hydrophobicity such as hexane to the extract.

It is preferred that before the below-mentioned step (iii), the extract is concentrated or subjected to a state wherein substantially no solvent is contained, by a known method such as distillation under reduced pressure. The reason is as follows.

Since the structure derived from the polymerizable component (A) having a high affinity to the polymerizable component (F) is introduced to the surface of the inorganic fine particles (D), as the amount of a solvent having a less affinity remained decreases, it becomes easier to suppress phase separation and agglomeration of the surface-modified inorganic fine particles (E) at the time of storing the extract of the surface-modified inorganic fine particles (E) temporarily or mixing the polymerizable component (F) in the step (iii). It is further preferred that a small amount of an alcohol such as methanol or ethanol is added at the time of conducting distillation under reduced pressure, thereby to remove water by azeotropic distillation.

Step (iii):

The step (iii) is a step of obtaining a photocurable material which contains the surface-modified inorganic fine particles (E), a polymerizable component (F) and a photopolymerization initiator (G).

(Polymerizable Component (F))

The polymerizable component (F) is a polymerizable component comprised of at least one type of a compound (f) having a (meth)acryloyloxy group. Of the compound (f), one type may be used alone, or two or more types may be used in combination. The polymerizable component (F) is preferably a combination of three types i.e. a compound (f1), a compound (f2) and a compound (f3), from the viewpoint of the release property, the mechanical strength and the transparency of the cured product.

The compound (f1) is a compound having at least two (meth)acryloyloxy groups (provided that the compound (f2) is excluded). The number of (meth)acryloyloxy groups in the compound (f1) is preferably from 2 to 10, particularly preferably from 2 to 6.

The compound (f1) may be a (meth)acrylate of bisphenol, a (meth)acrylate having a fluorene skeleton, a (meth)acrylate having a naphthalene skeleton, a (meth)acrylate of a diol such as a glycol, a (meth)acrylate of a triol such as glycerol or trimethylol, or a (meth)acrylate of a tetraol such as pentaerythritol, and is preferably a (meth)acrylate of a diol, a (meth)acrylate of a triol and a (meth)acrylate of a tetraol.

As the compound (f1), the following compounds may, for example, be mentioned.

Bisphenol A di(meth)acrylate, modified bisphenol A di(meth)acrylate (e.g. ethoxylated bisphenol A di(meth)acrylate, propoxylated bisphenol A di(meth)acrylate, propoxylated ethoxylated bisphenol A di(meth)acrylate, bisphenol A glycerolate di(meth)acrylate or bisphenol A propoxylate glycerolate di(meth)acrylate), ethoxylated bisphenol F di(meth)acrylate, fluorene di(meth)acrylate, tricyclodecane dimethanol di(meth)acrylate, ethylene glycol di(meth)acrylate, dipropylene glycol di(meth)acrylate, 1,3-butanediol di(meth)acrylate, 1,4-butanediol di(meth)acrylate, glycerol 1,3-diglycerolate di(meth)acrylate, 1,6-hexanediol ethoxylate di(meth)acrylate, 1,6-hexanediol propoxylate di(meth)acrylate, 1,6-hexanediol di(meth)acrylate, 3-hydroxy-2,2-dimethylpropionate di(meth)acrylate, 1,9-nonanediol di(meth)acrylate, 1,10-decanediol di(meth)acrylate, diethylene glycol di(meth)acrylate, neopentyl glycol di(meth)acrylate, neopentyl glycol propoxylate di(meth)acrylate, polyethylene glycol di(meth)acrylate, propylene glycol di(meth)acrylate, glycerol di(meth)acrylate, propylene glycol glycerolate di(meth)acrylate, polypropylene glycol di(meth)acrylate, polyoxyethylene glycol di(meth)acrylate, tripropylene glycol di(meth)acrylate, triethylene glycol di(meth)acrylate, tetraethylene glycol di(meth)acrylate, tripropylene glycol glycerolate di(meth)acrylate, 2-hydroxy-3-acryloyloxypropyl(meth)acrylate, 2-methyl-1,3-propanediol diacrylate, trimethylolpropane benzoate di(meth)acrylate, pentaerythritol di(meth)acrylate monostearate and trimethylolpropane ethoxylate methyl ether di(meth)acrylate.

Further, diurethane di(meth)acrylate, a monomer having urethane bonds such as a urethane monomer or oligomer having at least two (meth)acryloyloxy groups and at least two urethane bonds and having a mass average molecular weight of from 400 to less than 1,600 and a viscosity at 25° C. of at most 20 Pa·s, or a monomer containing a silicon atom such as 1,3-bis(3-methacryloyloxypropyl)-1,1,3,3-tetramethyl disiloxane, may be employed.

Trimethylolpropane tri(meth)acrylate, trimethylolpropane ethoxy tri(meth)acrylate, polyether tri(meth)acrylate, glycerinpropoxy tri(meth)acrylate, pentaerythritol tri(meth)acrylate, ethoxylated isocyanurate triacrylate, ethoxylated trimethylolpropane triacrylate and propoxylated trimethylolpropane triacrylate.

Pentaerythritol tetra(meth)acrylate, pentaerythritol ethoxy tetra(meth)acrylate, ditrimethylolpropane tetra(meth)acrylate, propoxylated pentaerythritol tetraacrylate, dipentaerythritol-hexa(meth)acrylate, aromatic urethane tri(meth)acrylate, aromatic urethane tetra(meth)acrylate, aromatic urethane hexa(meth)acrylate, etc.

Of the compound (f1), one-type may be used alone, or two or more types may be used in combination. The content of the compound (f1) is from 15 to 70 mass %, preferably from 25 to 60 mass %, in the total (100 mass %) of the compound (f1), the compound (f2) and the compound (f3). When the content of the compound (f1) is at least 15 mass %, the mechanical strength of the cured product becomes good. When the content of the compound (f1) is at most 70 mass %, phase separation of the cured product will not occur.

The compound (f2) is a compound having fluorine atoms and at least one (meth)acryloyloxy group.

The compound (f2) may, for example, be a fluoro(meth)acrylate. From the viewpoint of the compatibility, a fluoro (meth)acrylate is preferred.

As the fluoro(meth)acrylate, the following compounds may be mentioned.

3-(perfluoro-3-methylbutyl)-2-hydroxypropyl(meth)acrylate, 2,2,2-trifluoro-1-(trifluoromethyl)ethyl(meth)acrylate, $CH_2=CHCOO(CH_2)_2(CF_2)_{10}F$, $CH_2=CHCOO(CH_2)_2(CF_2)_8F$, $CH_2=CHCOO(CH_2)_2(CF_2)_6F$, $CH_2=C(CH_3)COO(CH_2)_2(CF_2)_{10}F$, $CH_2=C(CH_3)COO(CH_2)_2(CF_2)_8F$, $CH_2=C(CH_3)COO(CH_2)_2(CF_2)_6F$, $CH_2=CHCOOCH_2(CF_2)_6F$, $CH_2=C(CH_3)COOCH_2(CF_2)_6F$, $CH_2=CHCOOCH_2(CF_2)_7F$, $CH_2=C(CH_3)COOCH_2(CF_2)_7F$, $CH_2=CHCOOCH_2CF_2CF_2H$, $CH_2=CHCOOCH_2(CF_2CF_2)_2H$, $CH_2=CHCOOCH_2(CF_2CF_2)_4H$, $CH_2=C(CH_3)COOCH_2CF_2CF_2H$, $CH_2=C(CH_3)COOCH_2(CF_2CF_2)_2H$, $CH_2=C(CH_3)COOCH_2(CF_2CF_2)_4H$, $CH_2=CHCOOCH_2CF_2OCF_2CF_2OCF_3$, $CH_2=CHCOOCH_2CF_2O(CF_2CF_2O)_3CF_3$, $CH_2=C(CH_3)COOCH_2CF_2OCF_2CF_2OCF_3$, $CH_2=C(CH_3)COOCH_2CF_2O(CF_2CF_2O)_3CF_3$, $CH_2=CHCOOCH_2CF(CF_3)OCF_2CF(CF_3)O(CF_2)_3F$, $CH_2=CHCOOCH_2CF(CF_3)O(CF_2CF(CF_3)O)_2(CF_2)_3F$, $CH_2=C(CH_3)COOCH_2CF(CF_3)OCF_2CF(CF_3)O(CF_2)_3F$, $CH_2=C(CH_3)COOCH_2CF(CF_3)O(CF_2CF(CF_3)O)_2(CF_2)_3F$, $CH_2=CFCOOCH_2CH(OH)CH_2(CF_2)_6CF(CF_3)$, $CH_2=CFCOOCH_2CH(CH_2OH)CH_2(CF_2)_6CF(CF_3)_2$ $CH_2=CFCOOCH_2CH(OH)CH_2(CF_2)_{10}$, $CH_2=CFCOOCH_2CH(CH_2OH)CH_2(CF_2)_{10}F$, $CH_2=CHCOOCH_2CF_2(OCF_2CF_2)_p$ $OCF_2CH_2OCOCH=CH_2$ (wherein p is an integer of from 4 to 20), $CH_2=CHCOOCH_2(CF_2)_4CH_2OCOCH=CH_2$, $CH_2\!=\!C(CH_3)COOCH_2(CF_2)_4CH_2OCOC(CH_3)\!=\!CH_2$, etc.

The fluoro(meth)acrylate is preferably the compound (f21), from the viewpoint of the compatibility and environmental characteristics.

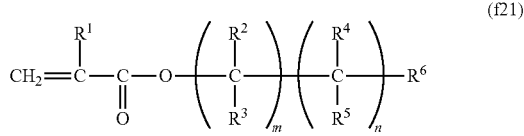

(f21)

wherein $R^1$ is a hydrogen atom or a methyl group, each of $R^2$ and $R^3$ is a hydrogen atom or a $C_{1-4}$ alkyl group, each of $R^4$ and $R^5$ is a fluorine atom, a $C_{1-4}$ perfluoroalkyl group or a $C_{1-4}$ perfluoroalkoxy group, $R^6$ is a hydrogen atom or a fluorine atom, m is an integer of from 1 to 4, and n is an integer of from 1 to 16. n is preferably an integer of from 1 to 10 from the viewpoint of the compatibility, more preferably an integer of from 3 to 6 from the viewpoint of environmental characteristics.

Of the compound (f2), one type may be used alone, or two or more types may used in combination.

The content of the compound (f2) is from 5 to 45 mass %, preferably from 15 to 35 mass %, in the total (100 mass %) of the compound (f1), the compound (f2) and the compound (f3). When the content of the compound (f2) is at least 5 mass %, it is possible to obtain a cured product excellent in release property, and further, it is possible to suppress foaming of the photocurable material. Since foaming of the photocurable material can be suppressed, filtration becomes easy during the preparation, and further, it is possible to eliminate a defect in the pattern shape due to inclusion of foams during nanoimprinting. When the content of the compound (f2) is at most 45 mass %, mixing can be carried out uniformly, whereby a cured product having an excellent mechanical strength can be obtained.

The compound (f3) is a compound having one (meth) acryloyloxy group (provided that the compound (f2) is excluded).

The compound (f3) is a component to let another component dissolve and to improve the compatibility of the compound (f1) with the compound (f2). When the compatibility of the compound (f1) with the compound (f2) is good, it is possible to suppress foaming at the time of preparation of a photocurable material and to facilitate filtration through the filter, whereby preparation of the photocurable material will be facilitated, or a uniform photocurable material can be obtained. Further, since a homogeneous cured product is obtainable, the release property and the mechanical strength may be sufficiently provided.

As the compound (f3), the following compounds may be mentioned. In these compounds, it is preferred that a $C_{1-30}$ organic group is bonded to an oxygen atom in the ester structure (COO—). The number of carbon atoms in the organic group is more preferably from 4 to 20, particularly preferably from 4 to 12.

The organic group may, for example, be a linear alkyl group, a branched alkyl group, a cycloalkyl group, an alkyl group substituted by an aryl group, an allyl group, a bridged hydrocarbon group, a group having a repeated structure of an oxyalkylene chain, an aromatic group or a heterocyclic group. These groups may be substituted by a hetero atom such as a nitrogen atom or an oxygen atom, or a silicon atom, or a functional group such as a hydroxy group or an amino group, and may have an unsaturated bond or a free carboxy group.

Among them, the organic group is preferably a linear alkyl group, a branched alkyl group, a cycloalkyl group or a bridged hydrocarbon group.

As the compound (f3), the following compounds may, for example, be mentioned.

Phenoxyethyl(meth)acrylate, 2-hydroxy-3-phenoxypropyl(meth)acrylate, phenoxyethylene glycol (meth)acrylate, phenoxydiethylene glycol (meth)acrylate, benzyl(meth) acrylate, methoxytriethylene glycol (meth)acrylate, methoxypolyethylene glycol (meth)acrylate, 2-(meth)acryloyloxyethyl hexahydrophthalic acid, biphenyl (meth)acrylate, 2-(meth)acryloyloxyethyl succinic acid, stearyl(meth)acrylate, isostearyl(meth)acrylate, lauryl(meth)acrylate, 2-ethylhexyl(meth)acrylate, 3-(trimethoxysilyl) propyl(meth)acrylate, butyl(meth)acrylate, ethoxyethyl(meth)acrylate, methoxyethyl(meth)acrylate, glycidyl(meth)acrylate, tetrahydrofurfuryl(meth)acrylate, allyl(meth)acrylate, 2-hydroxyethyl(meth)acrylate, 2-hydroxypropyl(meth)acrylate, N,N-diethylaminoethyl(meth)acrylate, N,N-dimethylaminoethyl(meth)acrylate, dimethylaminoethyl(meth)acrylate, 2-methyl-2-adamantyl(meth)acrylate, 2-ethyl-2-adamantyl (meth)acrylate, 3-hydroxy-1-adamantyl(meth)acrylate, 1-adamantyl (meth)acrylate, isobornyl(meth)acrylate, β-carboxyethyl(meth)acrylate, octyl (meth)acrylate, decyl(meth) acrylate, (2-(tert-butylamino)ethyl(meth)acrylate, 1,2,2,6,6-pentamethyl-4-piperidyl(meth)acrylate, n-butyl(meth) acrylate, tert-butyl (meth)acrylate, 4-tert-butylcyclohexyl (meth)acrylate, etc.

Of the compound (f3), one type may be used alone, or two or more types may be used in combination.

The content of the compound (f3) is from 10 to 65 mass %, preferably from 15 to 50 mass %, in the total (100 mass %) of the compound (f1), the compound (f2) and the compound (f3). When the content of the compound (f3) is at least 10 mass %, the compatibility of the compound (f1) with the compound (f2) becomes good. When the content of the compound (f3) is at most 65 mass %, the value indicating the sensitivity becomes at most 1,000 mJ/cm$^2$, whereby the photocurable material shows a good sensitivity.

(Photopolymerization Initiator (G))

The photopolymerization initiator (G) may, for example, be an acetophenone photopolymerization initiator, a benzoin photopolymerization initiator, a benzophenone photopolymerization initiator, a thioxanthone photopolymerization initiator, an α-amino ketone photopolymerization initiator, an α-hydroxy ketone photopolymerization initiator, an α-acyloxime ester, benzyl-(o-ethoxycarbonyl)-α-monoxime, acylphosphine oxide, glyoxyester, 3-ketocoumarin, 2-ethylanthraquinone, camphorquinone, tetramethylthiuram sulfide, azobisisobutylonitrile, benzoyl peroxide, a dialkyl peroxide or tert-butylperoxy pivalate. Among them, an acetophenone photopolymerization initiator, a benzoin photopolymerization initiator, an α-amino ketone photopolymerization initiator or a benzophenone photopolymerization initiator is preferred from the viewpoint of the sensitivity and the compatibility.

As the acetophenone photopolymerization initiator, the following compounds may be mentioned.

Acetophenone, p-(tert-butyl)1',1',1'-trichloroacetophenone, chloroacetophenone, 2',2'-diethoxyacetophenone, hydroxyacetophenone, 2,2-dimethoxy-2'-phenylacetophenone, 2-aminoacetophenone, a dialkylaminoacetophenone, etc.

As the benzoin photopolymerization initiator, the following compounds may be mentioned.

Benzyl, benzoin, benzoin methyl ether, benzoin ethyl ether, benzoin isopropyl ether, benzoin isobutyl ether, 1-hydroxycyclohexyl phenyl ketone, 2-hydroxy-2-methyl-1-phenyl-2-methylpropan-1-one, 1-(4-isopropylphenyl)-2-hydroxy-2-methylpropan-1-one, benzyl dimethyl ketal, etc.

As the α-amino ketone photopolymerization initiator, the following compounds may be mentioned.

2-Benzyl-2-dimethylamino-1-(4-morpholinophenyl)-butanone-1,2-methyl-1 [4-(methylthio)phenyl]-2-morpholino-propan-1-one, etc.

As the benzophenone photopolymerization initiator, the following compounds may be mentioned.

Benzophenone, benzoyl benzoic acid, methyl benzoyl benzoate, methyl-o-benzoyl benzoate, 4-phenylbenzophenone, hydroxybenzophenone, hydroxypropylbenzophenone, acrylbenzophenone, 4,4'-bis(dimethylamino)benzophenone, etc.

Of the photopolymerization initiator (G), one type may be used alone, or two or more types may be used in combination.
(Additives (H))

The photocurable material may contain additives (H) other than the surface-modified inorganic fine particles (E), the polymerizable component (F) and the photopolymerization initiator (G).

The additives (H) may, for example, be a surfactant, a photosensitizer, other resins, a carbon compound, metal fine particles and other organic compounds.

The surfactant is preferably a fluorinated surfactant. In a case where the fluorinated surfactant is used, an effect of improving the release property of the cured product will be obtained.

As the fluorinated surfactant, a fluorinated surfactant having a fluorine content of from 10 to 70 mass % is preferred, and a fluorinated surfactant having a fluorine content of from 10 to 40 mass % is more preferred. The fluorinated surfactant may be water-soluble or lipid-soluble, preferably lipid-soluble from the viewpoint of the compatibility of the photocurable material and the dispersibility of the cured product.

The fluorinated surfactant is preferably an anionic fluorinated surfactant, a cationic fluorinated surfactant, an amphoteric fluorinated surfactant or a nonionic fluorinated surfactant, and from the viewpoint of the compatibility of the photocurable material and the dispersibility of the cured product, the nonionic fluorinated surfactant is more preferred.

The anionic fluorinated surfactant is preferably a polyfluoroalkyl carboxylic acid salt, a polyfluoroalkylphosphoric acid ester or a polyfluoroalkylsulfonic acid salt.

Specific examples of the anionic fluorinated surfactant include Surflon S-111 (tradename, manufactured by AGC Seimi Chemical Co., Ltd.), Fluorad FC-143 (tradename, manufactured by Sumitomo 3M Limited) and MEGAFACE F-120 (tradename, manufactured by DIC).

The cationic fluorinated surfactant is preferably a trimethylammonium salt of polyfluoroalkylcarboxylic acid, or a trimethylammonium salt of polyfluoroalkylsulfonic acid amide.

Specific examples of the cationic fluorinated surfactant include Surflon S-121 (tradename, manufactured by AGC Seimi Chemical Co., Ltd.), Fluorad FC-134 (tradename, manufactured by Sumitomo 3M Limited) and MEGAFACE F-150 (tradename, manufactured by DIC).

The amphoteric fluorinated surfactant is preferably a polyfluoroalkylbetain.

Specific examples of the amphoteric fluorinated surfactant include Surflon S-132 (tradename, manufactured by AGC Seimi Chemical Co., Ltd.), Fluorad FC-172 (tradename, manufactured by Sumitomo 3M Limited) and MEGAFACE F-120 (tradename, manufactured by DIC).

The nonionic fluorinated surfactant is preferably a polyfluoroalkylamine oxide or a polyfluoroalkyl-alkylene oxide adduct.

Specific examples of the nonionic fluorinated surfactant include Surflon S-145 (tradename, manufactured by AGC Seimi Chemical Co., Ltd.), Surflon S-393 (tradename, manufactured by AGC Seimi Chemical Co., Ltd.), Surflon KH-20 (tradename, manufactured by AGC Seimi Chemical Co., Ltd.), Surflon KH-40 (tradename, manufactured by AGC Seimi Chemical Co., Ltd.), Fluorad FC-170 (tradename, manufactured by Sumitomo 3M Limited), Fluorad FC-430 (tradename, manufactured by Sumitomo 3M Limited) and MEGAFACE F-141 (tradename, manufactured by DIC).

The photosensitizer may, for example, be n-butylamine, di-n-butylamine, tri-n-butylphosphine, allylthiourea, s-benzyl isothiulonium-p-toluene sulfinate or an amine compound such as triethylamine, diethylaminoethyl methacrylate, triethylene tetramine, or 4,4'-bis(dialkylamino)benzophenone.

The other resins may, for example, be a polystyrene, a polythiophene, a polyester oligomer, a polycarbonate or a poly(meth)acrylate.

The carbon compound may, for example, be carbon nanotube or fullerene.

The metal fine particles may, for example, be copper or platinum.

Other organic compounds may, for example, be porphyrin or metal-encapsulated porphyrin.

The total amount of the additives (H) is preferably at most 10 mass % in the photocurable material (100 mass %). When the total amount of the additives (H) is at most 10 mass %, they can be uniformly mixed in the photocurable material, whereby a homogeneous photocurable material can be obtained.

The timing for adding the additives (H) may be in-between the step (i) and the step (iii), or after the step (iii), and is preferably after the step (iii).
(Preparation of Photocurable Material)

Preparation of the Photocurable Material May, for Example, be Carried Out by adding the polymerizable component (F) to the surface-modified inorganic fine particles (E) and mixing well, followed by adding the photopolymerization initiator (G) and mixing well.

The surface-modified inorganic fine particles (E) may be in a state of extract, a state in which the extract is concentrated, or a state having substantially no solvent. In a case where the surface-modified inorganic fine particles (E) are not in a state having substantially no solvent, in the step (iii), by using a known method such as distillation under reduced pressure, the photocurable material is made in a state having substantially no solvent.

In the step (i), the polymerizable component (A) is reacted with the compound (B) and becomes the surface modifier (C). Therefore, the step (iii) is carried out from the concept of reducing the amount of the surface modifier (C) as low as possible in the photocurable material, and from the viewpoint of imparting photocurable characteristics since the surface modifier (C) no longer has photocurable characteristics equivalent to those of the polymerizable component (A) and the polymerizable component (F).

Therefore, in the step (iii), the mass ratio of the polymerizable component (F) to the mass of the polymerizable component (A) in the step (i) depends on the content of the inorganic fine particles (D) in the photocurable material to be finally obtained. In a case where the content of the inorganic fine particles (D) of the photocurable material to be finally obtained is low, the mass ratio of the polymerizable component (F) to the mass of the polymerizable component (A) in the step (i) becomes large, and on the contrary, in a case where the content of the inorganic fine particles (D) in the photocurable material to be finally obtained is large, the mass ratio of the polymerizable component (F) to the mass of the polymerizable component (A) in the step (i) becomes small. The mass ratio (A/F) is preferably from 0.01 to 100, more preferably from 0.1 to 10. If the mass ratio (A/F) is less than 0.01, the photocurable material to be obtained is likely to be comprised substantially of the surface-modified inorganic fine particles (E) only, whereby the curable property, the viscosity, etc. of the polymerizable component (A) and the polymerizable component (F) which are designed for the photocurable material are likely to be different in the end, or the handling efficiency of the photocurable material is likely to be impaired due to its thixotropy. If the mass ratio (A/F) exceeds 100, in the step (ii), the inorganic fine particles (D) are to be extracted by using a trace amount of the surface modifier (C), and therefore the production process of the present invention will not work well.

The contents of respective starting materials in the steps (i) to (iii) are as follows.

The content of the total of the polymerizable component (A) and the polymerizable component (F) is preferably from 10 to 98.8 mass %, more preferably from 15 to 98 mass %, in the total (100 mass %) of the polymerizable component (A), the compound (B), the inorganic fine particles (D), the polymerizable component (F) and the photopolymerization initiator (G). When the content of the total of the polymerizable component (A) and the polymerizable component (F) is at least 10 mass %, the photocurable property of the photocurable material becomes sufficient. When the content of the total of the polymerizable component (A) and the polymerizable component (F) is at most 98.8 mass %, it becomes easier to mix each of the starting materials uniformly.

The content of the compound (B) is preferably from 0.01 to 28 mass %, more preferably from 0.1 to 15 mass %, in the total (100 mass %) of the polymerizable component (A), the compound (B), the inorganic fine particles (D), the polymerizable component (F) and the photopolymerization initiator (G). When the content of the compound (B) is at least 0.01 mass %, the surface-modified inorganic fine particles (E) will be dispersed stably. When the content of the compound (B) is at most 28 mass %, the photocurable material is likely to show an optical property as estimated.

The content of the inorganic fine particles (D) is preferably from 0.1 to 75 mass %, more preferably from 2 to 57 mass %, in the total (100 mass %) of the polymerizable component (A), the compound (B), the inorganic fine particles (D), the polymerizable component (F) and the photopolymerization initiator (G). When the content of the inorganic fine particles (D) is at least 0.1 mass %, effects such that changes in physical properties are shown due to formation of composite materials with the inorganic fine particles (D). When the content of the inorganic fine particles (D) is at most 75 mass %, it becomes possible to disperse the inorganic fine particles (D) without agglomeration.

The content of the photopolymerization initiator (G) is preferably from 0.1 to 9 mass %, more preferably from 0.5 to 6 mass %, in the total (100 mass %) of the polymerizable component (A), the compound (B), the polymerizable component (F) and the photopolymerization initiator (G). When the content of the photopolymerization initiator (G) is at least 0.1 mass %, it is possible to easily obtain a cured product without carrying out an operation of e.g. heating. When the content of the photopolymerization initiator (G) is at most 9 mass %, mixing can be carried out uniformly, whereby the photopolymerization initiator (G) remained in the cured product will be less, and deterioration of the physical properties of the cured product can be suppressed.

By the production process for the photocurable material of the present invention as described above, from the following reason, it is possible to easily produce the photocurable material which can form a cured product having a high transparency and a high refractive index.

The polymerizable component (A) and the compound (B) are reacted in the step (i) to obtain the surface modifier (C), and then the surface of the inorganic fine particles (D) is modified with the surface modifier (C) in the step (ii) to obtain the surface-modified inorganic fine particles (E), whereby it is possible to easily introduce to the surface of the inorganic fine particles (D), a structure derived from the polymerizable component (A) which has a high affinity to the polymerizable component (F) and which becomes a polymerizable group, in a state wherein the existence of a third component other than the polymerizable component (A) and the inorganic fine particles (D) is reduced as much as possible. Since the surface-modified inorganic fine particles (E) have both of the affinity to the polymerizable component (F) and the polymerizable group, the dispersibility of the surface-modified inorganic fine particles (E) is maintained in the photocurable material obtained in the step (iii) and at the time of curing it. Further, a compound modifying the inorganic fine particles (D) is not bulky. Therefore, it becomes possible to form a cured product having a high transparency and a high refractive index.

<Photocurable Material>

The photocurable material of the present invention is a composition obtained by the production process of the present invention, and contains the surface-modified inorganic fine particles (E), the polymerizable component (F) and the photopolymerization initiator (G).

It is preferred that the photocurable material of the present invention contains substantially no-solvent When the photocurable material contains substantially no solvent, curing of the photocurable material can easily be carried out without carrying out any special operation (such as an operation to heat the photocurable material at a high temperature to remove the solvent) other than irradiation with light.

The solvent is a compound having an ability to dissolve or disperse any one of the surface-modified inorganic fine particles (E), the polymerizable component (F) and the photopolymerization initiator (G).

"Contains substantially no solvent" means that no solvent is contained at all, or a solvent to be used at the time of preparing the photocurable material may be contained as a residual solvent. However, the residual solvent is preferably removed as far as possible, and is more preferably at most 10 mass % in the photocurable material (100 mass %).

The sensitivity of the photocurable material of the present invention may be represented by the integrated quantity of light until the photocurable material is completely cured when the photocurable material having a thickness of about 1.5 μm is irradiated with light from a high pressure mercury lamp (a light source having main wavelengths of 254, 315 and 365 nm at from 1.5 to 2.0 kHz). The integrated quantity of light is preferably at most 1,000 mJ/cm$^2$, more preferably from 150 mJ/cm$^2$ to 750 mJ/cm$^2$. If the integrated quantity of light exceeds 1,000 mJ/cm$^2$, it takes a time of at least 20 seconds to cure the photocurable material, whereby the production efficiency tends to be poor.

The photocurable material of the present invention preferably has a refractive index of at least 1.54, more preferably from 1.54 to 1.62, at a wavelength of 589 nm after curing. If such a refractive index is less than 1.54, the focal distance cannot be substantially reduced, whereby the size of an optical element such as a microlens array cannot be reduced.

The refractive index at a wavelength of 589 nm of the photocurable material after curing, is measured at 23° C. by using an Abbe refractometer.

The contact angle to water after curing of the photocurable material of the present invention serves as an index for the release property of the cured product. Such a contact angle is preferably at least 75°, more preferably from 80 to 116°. If the contact angle is less than 75°, releasing tends to be difficult, and the photocurable material tends to adhere to the mold, whereby the mold is likely to break. The contact angle is measured in accordance with JIS R3257.

The above-described photocurable material of the present invention has both of the affinity to the polyemrizable component (F) and the polymerizable group, and contains the surface-modified inorganic fine particles (E) wherein a compound modifying the inorganic fine particles is not bulky, whereby it is possible to form a cured product having a high transparency and a high refractive index.

<Article>

The article of the present invention is an article obtained by curing the photocurable material of the present invention, or an article comprising a substrate, and a cured film obtained by curing the photocurable material of the present invention formed on the surface of the substrate.

As an example of the article of the present invention, the process for producing a molded product having a fine pattern on its surface will be described below.

(Process for Producing Molded Product Having Fine Pattern on its Surface)

The process for producing a molded product having a fine pattern on its surface comprises the following steps (1) to (3):

(1) a step of bringing the photocurable material of the present invention in contact with a surface of a mold, having a reverse pattern of said fine pattern, (2) a step of irradiating the photocurable material with light in such a state that the photocurable material is in contact with the surface of the mold, to cure the photocurable material to form a cured product, and (3) a step of separating the mold from the cured product to obtain a molded product having a fine pattern on its surface.

More specifically, the following processes (I) to (III) may be mentioned as the process for producing a molded product having a fine pattern on its surface.

Process (I):

A process comprising the following steps (1-1) to (1-4):

(I-1) a step of placing the photocurable material 20 on a surface of a substrate 30, as shown in FIG. 1, (I-2) a step of pressing a mold 10 against the photocurable material 20 so that the reverse pattern 12 of the mold 10 is in contact with the photocurable material 20, as shown in FIG. 1, (I-3) a step of irradiating the photocurable material 20 with light in such a state that the mold 10 is pressed against the photocurable material 20, to cure the photocurable material 20 to form a cured product, and (I-4) a step of separating the mold 10, or the substrate 30 and the mold 10, from the cured product to obtain a molded product having a fine pattern on its surface.

Figure 2:
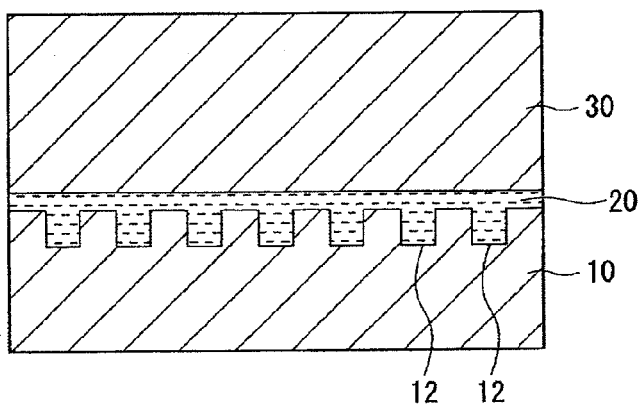
FIG. 2 is a cross-sectional view illustrating another embodiment of the process for producing a molded product having a fine pattern on its surface.

Process (II):

A process comprising the following steps (II-1) to (II-4):
(II-1) a step of placing the photocurable material 20 on a surface of the mold 10, having the reverse pattern 12, as shown in FIG. 2, (II-2) a step of pressing a substrate 30 against the photocurable material 20 on the surface of the mold 10, as shown in FIG. 2, (II-3) a step of irradiating the photocurable material 20 with light in such a state that the substrate 30 is pressed against the photocurable material 20, to cure the photocurable material 20 to form a cured product, and (II-4) a step of separating the mold 10, or the substrate 30 and the mold 10, from the cured product to obtain a molded product having a fine pattern on its surface.

Process (III):

A process comprising the following steps (III-1) to (III-4):

(III-1) a step of bringing a substrate 30 and a mold 10 to be close to or in contact with each other, so that the reverse pattern 12 or the mold 10 is on the substrate 30 side, as shown in FIG. 1, (III-2) a step of filling the photocurable material 20 between the substrate 30 and the mold 10, as shown in FIG. 1, (III-3) a step of irradiating the photocurable material 20 with light in such a state that the substrate 30 and the mold 10 are close to or in contact with each other, to cure the photocurable material 20 to form a cured product, and (III-4) a step of separating the mold 10, or the substrate 30 and the mold 10, from the cured product to obtain a molded product having a fine pattern on its surface.

The substrate may, for example, be a substrate made of an inorganic material or a substrate made of an organic material.

As the inorganic material, a silicon wafer, glass, quartz glass, a metal (such as aluminum, nickel or copper), a metal oxide (such as alumina), silicon nitride, aluminium nitride or lithium niobate may, for example, be mentioned.

As the organic material, a fluororesin, a silicone resin, an acrylic resin, a polycarbonate, a polyester (such as polyethylene terephthalate), a polyimide, a polypropyrene, a polyethylene, a nylon resin, a polyphenylene sulfide or a cyclic polyolefin may, for example, be mentioned.

As the substrate, a surface-treated substrate may be employed, since it is excellent in the adhesion with the photocurable material. The surface treatment may, for example, be primer-coating treatment, ozone treatment or plasma etching treatment. As the primer to be used for primer coating treatment, a silane coupling agent or silazane may, for example, be mentioned.

The mold may be a mold made of a light-non-transmitting material or a mold made of a light-transmitting material.

As the light-non-transmitting material for the mold, a silicon wafer, nickel, copper, stainless steel, titanium, SiC or mica may, for example, be mentioned.

As the light-transmitting material for the mold, quartz, glass, a polydimethylsiloxane, a cyclic polyolefin, a polycarbonate, a polyethylene terephthalate or a transparent fluororesin may, for example, be mentioned.

At least one of the substrate and the mold is made of a material which transmits at least 40% of light having a wavelength with which the photopolymerization initiator (G) is reactive.

The mold has a reverse pattern on its surface. The reverse pattern is a reverse pattern corresponding to the fine pattern on the surface of the molded product.

The reverse pattern has fine convexes and/or concaves.

The convexes may, for example, be long convex lines extending on the surface of the mold or protrusions dotted on the surface.

The concaves may, for example, be long grooves extending on the surface of the mold or holes dotted on the surface.

The shape of the convex lines or grooves may, for example, be linear, curved or bent. The convex lines or grooves may be a plurality of stripes extending in parallel with one another.

The cross-sectional shape of the convex lines or grooves in a direction perpendicular to the longitudinal direction may, for example, be rectangular, trapezoidal, triangular or semi-circular.

The shape of the protrusions or holes may, for example, be triangular prism, quadrangular prism, hexagonal column, cylindrical column, triangular pyramid, quadrangular pyramid, hexagonal pyramid, circular corn, hemispherical or polyhedral.

The width of convex lines or grooves is preferably from 1 nm to 500 μm, more preferably from 10 nm to 100 μm, further preferably from 15 nm to 10 μm, on average. The width of the convex lines means the length of the bottom in the cross-section in a direction perpendicular to the longitudinal direction. The width of the grooves means the length of the upper side in the cross-section in a direction perpendicular to the longitudinal direction.

The width of the protrusions or holes is preferably from 1 nm to 500 μm, more preferably from 10 nm to 100 μm, further preferably from 15 nm to 10 μm, on average. The width of the protrusions means the length of the bottom in the cross-section in a direction perpendicular to the longitudinal direction, in a case where the bottom side is elongated, or otherwise means the maximum length at the bottom surface of the protrusions. The width of the holes means the length of the upper side in the cross-section in the direction perpendicular to the longitudinal direction, when the opening is elongated, or otherwise, means the maximum length at the openings of the holes.

The height of the convexes is preferably from 1 nm to 500 μm, more preferably from 10 nm to 100 μm, further preferably from 15 nm to 10 μm, on average.

The depth of the concaves is preferably from 1 nm to 500 μm, more preferably from 10 nm to 100 μm, further preferably from 15 nm to 10 μm, on average.

In an area where the reverse pattern is dense, the distance between the adjacent convexes (or concaves) is preferably from 1 nm to 500 μm, more preferably from 1 nm to 50 μm, on average. The distance between the adjacent convexes means the distance from the terminal edge of the bottom in the cross-section of a convex to the starting edge of the bottom in the cross-section of the adjacent convex. The distance between the adjacent concaves means the distance from the terminal edge of the upper side in the cross-section of a concave to the starting edge of the upper side in the cross-section of the adjacent concave.

The minimum dimension of a convex is preferably from 1 nm to 300 μm, more preferably from 1 nm to 500 nm, further preferably from 1 nm to 100 nm. The minimum dimension means the minimum dimension among the width, length and height of the convex.

The minimum dimension of a concave is preferably from 1 nm to 300 μm, more preferably from 1 nm to 500 nm, further preferably from 1 nm to 100 nm. The minimum dimension means the minimum dimension among the width, length and depth of the concave.

Step (I-1):

The method for placing the photocurable material may, for example, be an ink jetting method, a potting method, a spin coating method, a roll coating method, a casting method, a dip coating method, a die coating method, a Langmuir-blodgett method or a vacuum vapor deposition method.

The photocurable material may be placed over the entire surface of the substrate or on a part of the surface of the substrate.

Step (I-2):

The pressing pressure (gauge pressure) at the time of pressing the mold against the photocurable material is preferably more than 0 to at most 10 MPa, more preferably from 0.1 MPa to 5 MPa. The temperature at the time of pressing the mold against the photocurable material is preferably from 0 to 100° C., more preferably from 10 to 60° C.

Step (II-1):

The method for placing the photocurable material may, for example, be an ink jetting method, a potting method, a spin coating method, a roll coating method, a casting method, a dip coating method, a die coating method, a Langmuir-blodgett method or a vacuum vapor deposition method.

The photocurable material may be placed over the entire surface of the reverse pattern of the mold, or on a part of the reverse pattern, and it is preferably placed over the entire surface of the reverse pattern.

Step (II-2):

The pressing pressure (gauge pressure) at the time of pressing the substrate against the photocurable material is preferably more than 0 to at most 10 MPa, more preferably from 0.1 MPa to 5 MPa. The temperature at the time of pressing the substrate against the photocurable material is preferably from 0 to 100° C., more preferably from 10 to 60° C.

Step (III-2):

The method for filling the photocurable material between the substrate and the mold may, for example, be a method of aspirating the photocurable material into the space by a capillary phenomenon.

The temperature at the time of filling the photocurable material is preferably from 0 to 100° C., more preferably from 10 to 60° C.

Steps (I-3), (II-3) and (III-3):

The method for irradiation with light may, for example, be a method wherein using a mold made of light-transmitting material, light is applied from the mold side, or using a substrate made of a light-transmitting material, light is applied from the substrate side. The wavelength of the light is preferably from 200 to 500 nm. At the time of irradiation with light, the photocurable material may be heated to accelerate the curing.

The temperature at the time of irradiation with light is preferably from 0 to 100° C., more preferably from 10 to 60° C.

Steps (I-4), (II-4) and (III-4):

The temperature at the time of separating the mold, or the substrate and the mold, from the cured product, is preferably from 0 to 100° C., more preferably from 10 to 60° C.

Figure 3:
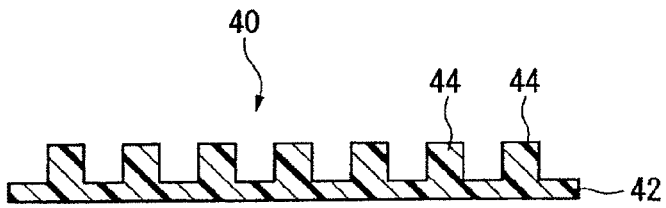
FIG. 3 is a cross-sectional view illustrating an embodiment of the molded product having a fine pattern on its surface.

In a case where the substrate and the mold are separated from the cured product, a molded product 40 having a fine pattern 44 on its surface is obtainable, which is composed solely of a cured product 42 having a surface on which the reverse pattern of the mold is transferred, as shown in FIG. 3.

Figure 4:
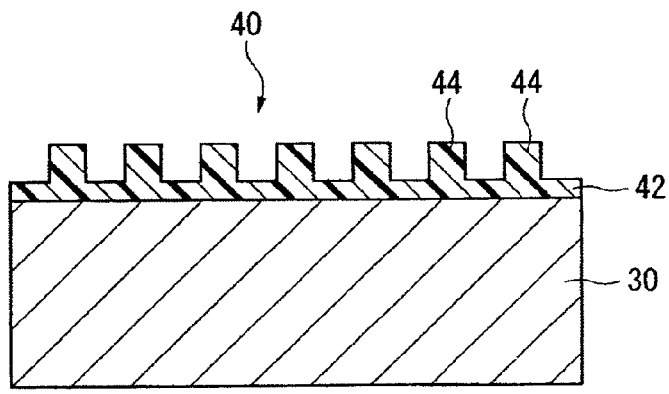
FIG. 4 is a cross-sectional view illustrating another embodiment of the molded product having a fine pattern on its surface.

In a case where only a mold is separated from the cured product, a molded product 40 (laminate) having a fine pattern 44 on its surface is obtainable, which comprises the substrate 30 and the cured product 42 having a surface on which the reverse pattern of the mold is transferred, as shown in FIG. 4.

As the molded product having a fine pattern on its surface, the following articles may be mentioned.

Optical elements: a microlens array, an optical waveguide, an optical switching element (such as a grid polarizing element or a wavelength plate), a Fresnel zone plate element, a binary element, a Blaise element, a photonic crystal, etc.

Anti-reflection components: an AR (Anti Reflection) coating component, etc.

Chips: a biochip, a chip for μ-TAS (Micro-Total Analysis Systems), a microreactor chip, etc.

Others: recording media, a display material, a carrier for a catalyst, a filter, a sensor component, a resist which will be used for the preparation of semiconductor devices, a daughter mold for nanoimprinting, etc.

By the above process for producing a molded product having a fine pattern on its surface, it is possible to produce a transparent molded product having a refractive index of at least 1.54 and having on its surface a fine pattern having the reverse pattern of the mold precisely transferred. "Transparent" means that the transmittance in a visible light region is at least 90% and the scattering (haze value) is at most 1%.

EXAMPLES

Now, the present invention will be described in further detail with reference to Examples, but it should be understood that the present invention is by no means restricted to such Examples.

Examples 1, 2 and 6 to 11 are Working Examples of the present invention, and Examples 3 to 5 are Comparative Examples.

(Refractive Index)

The refractive index of a cured product was obtained as follows.

A photocurable material was spread to have a thickness of 100 μm by doctor blade and then irradiated for 30 minutes with light from a high pressure mercury lamp (a light source having main wavelengths at 255, 315 and 365 nm at from 1.5 to 2.0 kHz) with an output power of 10 mW in a $N_2$ gas atmosphere to obtain a cured product. The cured product was carefully peeled and then molded by using a cutter knife to a size of 8 mm×24 mm, and then its refractive index at a wavelength of 589 nm was measured at 23° C. by means of an Abbe refractometer (2T model, manufactured by ATAGO).

(Transmittance, Haze)

The transmittance and the haze of a cured product was measured as follows.

A photocurable material was filled between two synthetic quartz substrates (thickness: 1 mm, transmittance: 95%) wherein a spacer having a thickness of 20 μm was sandwiched, and then irradiated with light for 10 minutes from a high pressure mercury lamp (a light source having main wavelengths at 255, 315 and 365 nm at from 1.5 to 2.0 kHz) with an output power of 10 mW for curing. Its transmittance and haze were measured by using the below-mentioned apparatus as it was. As a control, two synthetic quartz substrates which have a spacer sandwiched between them were used. The transmittance of at least 90% at 400 nm and the haze of at most 1.0% were judged to be good.

Transmittance: spectrophotometer (U-4100, manufactured by Hitachi, Ltd.),

Haze: hazemeter (HGM-3K, manufactured by Suga Test Instruments Co., Ltd.).

(Sensitivity)

The sensitivity of a photocurable material was obtained as follows.

A photocurable material was applied by a spin coating method to form a coating film having a thickness of about 1.5 μm, which was irradiated with light from a high pressure mercury lamp (a light source having main wavelengths at 254, 315 and 365 nm at from 1.5 to 2.0 kHz), whereby the integrated quantity of light until the material was completely cured, was obtained and taken as the sensitivity. Whether or not the photocurable material was completely cured, was judged by measuring the IR spectrum to see the presence or absence of an absorption of an olefin of the acrylic portion. When the integrated quantity of light was at most 1,000 mJ/cm², the sensitivity was judged to be good.

(Contact Angle)

The contact angle of a cured product to water was measured as follows.

A photocurable material was irradiated for 15 seconds with light from a high pressure mercury lamp (a light source having main wavelengths at 254, 315 and 365 nm at from 1.5 to 2.0 kHz) to obtain a cured product.

With respect to the cured product, the contact angle was measured by using a contact angle meter (CA-X150 model, manufactured by Kyowa Interface Science Co., Ltd.) by dropping 4 μL of water on the surface of the cured product in accordance with JIS R3257.

The contact angle to water is an index for the release property of the cured product. When the contact angle was at least 75°, the release property was judged to be good.

(pKa)

The pKa of the compound (B) of the present invention is a value measured at 20° C., and in the present Examples, it was calculated from a value of the pH of the 0.1 mol/L aqueous solution of the compound (B) measured by a pH meter (C62, manufactured by AS ONE Co., Ltd.). The neutral phosphate standard solution according to JIS Z8802 was used as the standard solution of pH 7, and the phthalate standard solution according to JIS Z8802 was used as the standard solution of pH 4. The measurement temperature was 20° C.

(Compound (B))

Compound (B-1): N-acetylcysteine, molecular weight: 163.2, pKa: 3.27.

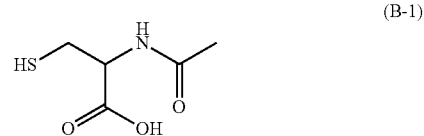

Compound (B-2): 3-mercaptopropionic acid, molecular weight: 106.1, pKa: 4.05.

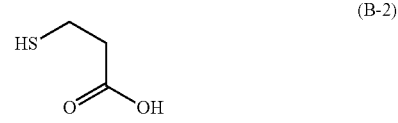

compound (B-3): thioglycolic acid, molecular weight: 92.1, pKa: 3.12.

(Inorganic Fine Particles (D))

Dispersion of titanium oxide fine particles (D-1): manufactured by Ishihara Sangyo Kaisha, Ltd., tradename: STS-01, average primary particle size: about 5 nm, content of titanium oxide: 30.1 mass %, specific gravity: 1.322.

Dispersion of zirconium oxide fine particles (D-2): manufactured by Nissan Chemical Industries, Ltd., ZR-AL, average primary particle size: about 5 nm, content of zirconium oxide: 30.5 mass %, specific gravity: 1.36.

(Compound (f))

Compound (f1-1): manufactured by Shinnakamura Kagaku Kogyo K.K., tradename: NPG (neopentyl glycol dimethacrylate).

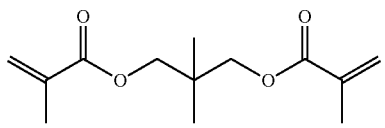

(f1-1)

Compound (f2-2): 3,3,4,4,5,5,6,6,7,7,8,8,8-tridecafluorooctyl methacrylic acid

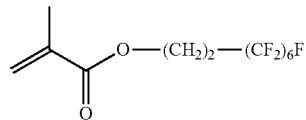

(f2-2)

Compound (f2-3): 2,2,3,3,4,4,5,5-octafluoro-1,6-hexanediol diacrylate

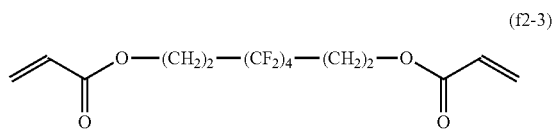

(f2-3)

Compound (f3-1): 2-methyl-2-adamantyl acrylate

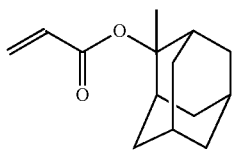

(f3-1)

(Photopolymerization Initiator (G))

Photopolymerization initiator (G-1): manufactured by Ciba Geigy Specialty, tradename: IRGACURE 651.

(Other Compounds)

Compound (I): manufactured by Tokyo Kasei Kogyo Co., Ltd., n-octyltriethoxysilane Compound (J): manufactured by Kanto Chemical Co., Inc., 1-octene Example 1

To a vial container (inner volume: 6 mL), 1.52 g of the compound (f1-1), 0.88 g of the compound (f2-2) and 1.44 g of the compound (f3-1) were added, and then filtrated by a filter made of polyethylene terephthalate (hereinafter referred to as PTFE) of 0.2 μm, to obtain a polymerizable component (F-1) (specific gravity: 1.05).

1.0 mL of the dispersion of the titanium oxide fine particles (D-1) was diluted with 9.0 mL of water to obtain an aqueous dispersion of the titanium oxide fine particles (D-1).

Step (i)

120 mg (0.735 mmol) of the compound (B-1) was added to the container, and then dissolved by introducing 3 mL of methyl-ethyl ketone (hereinafter referred to as MEK), followed by introducing 240 μL (0.982 mmol) of the polymerizable component (F-1) as the polymerizable component (A) and 3 mg of the photopolymerization initiator (G-1). The interior of the container was replaced with $N_2$ gas, and then an ultraviolet ray having a main wavelength of 365 nm was applied for 3 hours with an output power of 10 mW. MEK was introduced to the interior of the container to make 10 mL to obtain a solution of surface modifier (C-1).

Step (ii):

The aqueous dispersion of the titanium oxide fine particles (D-1) and the solution of the surface modifier (C-1) were stirred and mixed, and then left to stand still. Then, the mixed solution was separated into two phases and the upper phase became MEK phase and the lower phase became water phase. A portion of the water phase was collected and dried to measure its dry mass, but the residue was not found. MEK phase was collected, and then 10 mL of hexane was introduced to carry out stirring, followed by removing water found at the bottom of the container to obtain an extract of surface-modified inorganic fine particles (E-1).

Step (iii):

The extract of the surface-modified inorganic fine particles (E-1) was concentrated under reduced pressure, and 440 μL of the polymerizable component (F-1) was introduced in a half way, and then further concentrated under reduced pressure to remove the solvent, to obtain a semitransparent viscous liquid. 12 mg of the photopolymerization initiator (G-1) was added to obtain photocurable material (1). The mass % of the titanium oxide fine particles (D-1) in the photocurable material (1) was found to be 31.9 mass %, when it was calculated on an assumption that the total amount of the titanium oxide fine particles (D-1) was transferred to the MEK phase in the step (ii).

The proportions of the starting materials charged in Example 1 were shown in Table 1.

With respect to the photocurable material (1), various evaluations were carried out. The results are shown in Table 2. By the results shown in Table 2, it was confirmed that the titanium oxide fine particles (D-1) were dispersed in the photocurable material (1) without being agglomerated.

Example 2

In the same manner as in Example 1, the polymerizable component (F-1) was obtained.

1.2 mL of a dispersion of the zirconium oxide fine particles (D-2) was diluted with 3.8 mL of water to obtain an aqueous dispersion of the zirconium oxide fine particles (D-2).

Step (i):

By using the polymerizable component (F-1) as the polymerizable component A, in the same manner as in Example 1, a solution of surface modifier (C-1) was obtained.

Step (ii):

The aqueous dispersion of the zirconium oxide fine particles (D-2) and the solution of the surface modifier (C-1) were stirred, mixed and left to stand still. Then, the mixed solution was separated into two phases, and the upper phase became MEK phase and the lower phase became water phase. A portion of the water phase was collected and dried to measure its dry mass, but the residue was not found. The MEK phase was collected and then 10 mL of hexane was introduced to carry out stirring, followed by removing water found at the bottom of the container to obtain an extract of surface-modified inorganic fine particles (E-2).

Step (iii):

The extract of the surface-modified inorganic fine particles (E-2) was concentrated under reduced pressure, and 440 μL of the polymerizable component (F-1) was added in a halfway, and then further concentrated under reduced pressure to remove the solvent, to obtain a yellowish semitransparent viscous liquid. 10 mg of the photopolymerization initiator (G-1) was added to obtain photocurable material (2). The mass % of the zirconium oxide fine particles (D-2) in the photocurable material (2) was found to be 37 mass %, in a case where it was calculated on an assumption that the total amount of the zirconium oxide fine particles (D-2) was transferred to the MEK phase in the step (ii).

The proportions of the starting materials charged in Example 2 were shown in Table 1.

With respect to the photocurable material (2), various evaluations were carried out. The results are shown in Table 2. By the results shown in Table 2, it was confirmed that the zirconium oxide fine particles (D-2) was dispersed in the photocurable material (2) without being agglomerated.

Example 3

In the same manner as in Example 1, the polymerizable component (F-1) was obtained.

1.2 mL of a dispersion of the titanium oxide fine particles (D-1) was diluted with 3.8 mL of water to obtain an aqueous dispersion of the titanium oxide fine particles (D-1).

5 mL of MEK was introduced to the aqueous dispersion of the titanium oxide fine particles (D-1), and 200 μL (176 mg) of the compound (I) was introduced further, and then stirred for 4 hours while refluxing at 80° C. to carry out a silane coupling reaction. When the mixed liquid was left to stand still, it was separated into two phases, and then the upper phase became MEK phase and the lower phase became water phase. A portion of the water phase was collected and dried to measure its dry mass, but the residue was not found. The MEK phase was collected and then 5 mL of hexane was introduced to carry out stirring, followed by removing water found at the bottom of the container to obtain an extract of surface-modified inorganic fine particles (E'-3).

The extract of the surface-modified inorganic fine particles (E'-3) was concentrated under reduced pressure while introducing 200 μL of the polymerizable component (F-1) in a halfway. However, as concentration proceeds, the fine particles were agglomerated and became opaque, whereby the reaction was stopped. By such a process, it was impossible to stably disperse the fine particles in the polymerizable component (F-1).

Example 4

In the same manner as in Example 1, an aqueous dispersion of the titanium oxide fine particles (D-1) was obtained.

120 mg of the compound (B-1) was added to the container, and then 3 mL of MEK was introduced and dissolved to obtain a solution of the compound (B-1).

The aqueous dispersion of the titanium oxide fine particles (D-1) and the solution of the compound (B-1) were stirred, mixed and left to stand still. Then, the mixed solution was separated into two phases, and the upper phase became MEK phase and the lower phase became water phase. However, the titanium oxide fine-particles (D-1) were suspended between the upper phase and the lower phase as a white opaque solid matter. By such a process, it was impossible to extract the titanium oxide fine particles (D-1) in the dispersion to the MEK phase.

Example 5

In the same manner as in Example 1, an aqueous dispersion of the titanium oxide fine particles (D-1) was obtained.

Step (i):

120 mg of the compound (B-1) was added into the container, and 3 mL of MEK was introduced to dissolve it, and then 185 μL (132 mg) of the compound (J) and 3 mg of the photopolymerization initiator (G-1) were introduced thereto. The interior of the container was replaced by $N_2$ gas, and then an ultraviolet ray having a main wavelength of 365 nm was irradiated for 3 hours with an output power of 10 mW. MEK was introduced to the container to make 10 mL, and then a solution of surface modifier (C-5) was obtained.

Step (ii):

The aqueous dispersion of the titanium oxide fine particles (D-1) and the solution of the surface modifier (C-5) were stirred, mixed and left to stand still. Then, the mixed solution was separated into two phases, and the upper phase became MEK phase and the lower phase became water phase. A portion of the water phase was collected and dried to measure its dry mass, but the residue was not found. The MEK phase was collected and then 10 mL of hexane was introduced to carry out stirring, followed by removing water found at the bottom of the container to obtain an extract of surface-modified inorganic fine particles (E-5).

Step (iii):

The extract of the surface-modified inorganic fine particles (E-5) was concentrated under reduced pressure while introducing 200 μL of the polymerizable component (F-1) in a halfway. However, as concentration proceeds, the fine particles were agglomerated and became opaque, whereby the reaction was stopped. By such a process, it was impossible to stably disperse the fine particles in the polymerizable component (F-1).

Example 6

One droplet of the photocurable material in Example 1 was dropped on a silicon wafer at 25° C. to obtain a silicon wafer coated uniformly with the material. A quartz mold having on its surface concaves with a width of 800 nm, a depth of 180 nm and a length of 10 μm, was pressed against the photocurable material on the silicon wafer, followed by pressing under 0.5 MPa (gauge pressure) as it was.

Then, at 25° C., the photocurable material was irradiated for 15 seconds with light from a high pressure mercury lamp (a light source having main wavelengths at 255, 315 and 365 nm at from 1.5 to 2.0 kHz) from the mold side, to obtain a cured product of the photocurable material. At 25° C., the mold was separated from the silicon wafer to obtain a molded product having, formed on the surface of the silicon wafer, a cured product having on its surface convexes having the concave of the mold inverted. The heights of the convexes from the bottom to the top were from 178 to 180 nm.

Example 7

In the same manner as in Example 1, the polymerizable component (F-1) was obtained.

0.95 mL of the dispersion of the titanium oxide fine particles (D-1) was diluted with 9 mL of water to obtain an aqueous dispersion of the titanium oxide fine particles (D-1).

Step (i):

74 mg of the compound (B-2) was added to the container, and 3 mL of MEK was introduced to dissolve it, and then 240 µL of the polymerizable component (F-1) as the polymerizable component A and 3 mg of the photopolymerization initiator (G-1) were introduced thereto. The interior of the container was replaced by $N_2$ gas, and then an ultraviolet ray having a main wavelength of 365 nm was irradiated for 3 hours with an output power of 10 mW. MEK was introduced to the container to make 10 mL, and then a solution of surface modifier (C-7) was obtained.

Step (ii):

The aqueous dispersion of the titanium oxide fine particles (D-1) and the solution of the surface modifier (C-7) were stirred, mixed and left to stand still. Then, the mixed solution was separated into two phases, and the upper phase became MEK phase and the lower phase became water phase. A portion of the water phase was collected-and-dried to measure its dry mass, but the residue was not found. The MEK phase was collected and then 10 mL of hexane was introduced to carry out stirring, followed by removing water found at the bottom of the container to obtain an extract of surface-modified inorganic fine particles (E-7).

Step (iii):

The extract of the surface-modified inorganic fine particles (E-7) was concentrated under reduced pressure, and 440 µL of the polymerizable component (F-1) was introduced in a half way, and then further concentrated under reduced pressure to remove the solvent, to obtain a semitransparent viscous liquid. 12 mg of the photopolymerization initiator (G-1) was added to obtain photocurable material (7). The mass % of the titanium oxide fine particles (D-1) in the photocurable material (7) was found to be 32.0 mass %, when it was calculated on an assumption that the total amount of the titanium oxide fine particles (D-1) was transferred to the MEK phase in the step (ii).

The proportions of the starting materials charged in Example 7 were shown in Table 1.

With respect to the photocurable material (7), various evaluations were carried out. The results are shown in Table 2. By the results shown in Table 2, it was confirmed that the titanium oxide fine particles (D-1) were dispersed in the photocurable material (7) without being agglomerated.

Example 8

In the same manner as in Example 1, the polymerizable component (F-1) was obtained.

1.13 mL of the dispersion of the zirconium oxide fine particles (D-2) was diluted with 3.9 mL of water to obtain an aqueous dispersion of the zirconium oxide fine particles (D-2).

Step (i):

71 mg of the compound (B-2) was added to the container, and 3 mL of MEK was introduced to dissolve it, and then 240 µL of the polymerizable component (F-1) as the polymerizable component A and 3 mg of the photopolymerization initiator (G-1) were introduced thereto. The interior of the container was replaced by $N_2$ gas, and then an ultraviolet ray having a main wavelength of 365 nm was irradiated for 3 hours with an output power of 10 mW. MEK was introduced to the container to make 10 mL, and then a solution of surface modifier (C-8) was obtained.

Step (ii):

The aqueous dispersion of the zirconium oxide fine particles (D-2) and the solution of the surface modifier (C-8) were stirred, mixed and left to stand still. Then, the mixed solution was separated into two phases, and the upper phase became MEK phase and the lower phase became water phase. A portion of the water phase was collected and dried to measure its dry mass, but the residue was not found. The MEK phase was collected and then 10 mL of hexane was introduced to carry out stirring, followed by removing water found at the bottom of the container to obtain an extract of surface-modified inorganic fine particles (E-8).

Step (iii):

The extract of the surface-modified inorganic fine particles (E-8) was concentrated under reduced pressure, and 440 µL of the polymerizable component (F-1) was introduced in a half way, and then further concentrated under reduced pressure to remove the solvent, to obtain a semitransparent viscous liquid. 10 mg of the photopolymerization initiator (G-1) was added to obtain photocurable material (8). The mass % of the zirconium oxide fine particles (D-2) in the photocurable material (8) was found to be 37 mass %, when it was calculated on an assumption that the total amount of the zirconium oxide fine particles (D-2) was transferred to the MEK phase in the step (ii).

The proportions of the starting materials charged in Example 8 were shown in Table 1.

With respect to the photocurable material (8), various evaluations were carried out. The results are shown in Table 2. By the results shown in Table 2, it was confirmed that the zirconium oxide fine particles (D-2) were dispersed in the photocurable material (8) without being agglomerated.

Example 9

In the same manner as in Example 1, the polymerizable component (F-1) was obtained.

9.8 mL of the dispersion of the zirconium oxide fine particles (D-2) was diluted with 10.2 mL of water to obtain an aqueous dispersion of the zirconium-oxide fine particles (D-2).

Step (i):

532 mg of the compound (B-3) was added to the container, and 5 mL of MEK was introduced to dissolve it, and then 800 µL of the polymerizable component (F-1) as the polymerizable component A and 10 mg of the photopolymerization initiator (G-1) were introduced thereto. The interior of the container was replaced by $N_2$ gas, and then an ultraviolet ray having a main wavelength of 365 nm was irradiated for 3 hours with an output power of 10 mW. MEK was introduced to the container to make 20 mL, and then a solution of surface modifier (C-9) was obtained.

Step (ii):

The aqueous dispersion of the zirconium oxide fine particles (D-2) and the solution of the surface modifier (C-9) were stirred, mixed and left to stand still. Then, the mixed solution was separated into two phases, and the upper phase became MEK phase and the lower phase became water phase. A portion of the water phase was collected and dried to measure its dry mass, but the residue was not found. The MEK phase was collected and then 10 mL of hexane was introduced to carry out stirring, followed by removing water found at the bottom of the container to obtain an extract of surface-modified inorganic fine particles (E-9).

Step (iii):

The extract of the surface-modified inorganic fine particles (E-9) was concentrated under reduced pressure, and 100 µL of the polymerizable component (F-1) was introduced in a half way, and then further concentrated under reduced pressure to remove the solvent, to obtain a semitransparent viscous liquid. 15 mg of the photopolymerization initiator (G-1)

was added to obtain photocurable material (9). The mass % of the zirconium oxide fine particles (D-2) in the photocurable material (9) was found to be 73 mass %, when it was calculated on an assumption that the total amount of the zirconium oxide fine particles (D-2) was transferred to the MEK phase in the step (ii).

The proportions of the starting materials charged in Example 9 were shown in Table 1.

With respect to the photocurable material (9), various evaluations were carried out. The results are shown in Table 2. By the results shown in Table 2, it was confirmed that the zirconium oxide fine particles (D-2) were dispersed in the photocurable material (9) without being agglomerated.

Example 10

7.23 mL of the dispersion of the zirconium oxide fine particles (D-2) was diluted with 12.77 mL of water to obtain an aqueous dispersion of the zirconium oxide fine particles (D-2).

Step (i):

301 mg of the compound (B-3) was added to the container, and 5 mL of MEK was introduced to dissolve it, and then 943 μL of the polymerizable component (f2-2) as the polymerizable component A and 17 mg of the photopolymerization initiator (G-1) were introduced thereto. The interior of the container was replaced by $N_2$ gas, and then an ultraviolet ray having a main wavelength of 365 nm was irradiated for 3 hours with an output power of 10 mW. MEK was introduced to the container to make 20 mL, and then a solution of surface modifier (C-10) was obtained.

Step (ii):

The aqueous dispersion of the zirconium oxide fine particles (D-2) and the solution of the surface modifier (C-10) were stirred, mixed and left to stand still. Then, the mixed solution was separated into two phases, and the upper phase became MEK phase and the lower phase became water phase. A portion of the water phase was collected and dried to measure its dry mass, but the residue was not found. The MEK phase was collected and then 10 mL of hexane was introduced to carry out stirring, followed by removing water found at the bottom of the container to obtain an extract of surface-modified inorganic fine particles (E-10).

Step (iii):

The extract of the surface-modified inorganic fine particles (E-10) was concentrated under reduced pressure, and 180 μL of the polymerizable component (f2-2) was introduced in a half way, and then further concentrated under reduced pressure to remove the solvent, to obtain a semitransparent viscous liquid. 3 mg of the photopolymerization initiator (G-1) was added to obtain photocurable material (10). The mass % of the zirconium oxide fine particles (D-2) in the photocurable material (10) was found to be 60 mass %, when it was calculated on an assumption that the total amount of the zirconium oxide fine particles (D-2) was transferred to the MEK phase in the step (ii).

The proportions of the starting materials charged in Example 10 were shown in Table 1.

With respect to the photocurable material (10), various evaluations were carried out. The results are shown in Table 2. By the results shown in Table 2, it was confirmed that the zirconium oxide fine particles (D-2) were dispersed in the photocurable material (10) without being agglomerated.

Example 11

7.23 mL of the dispersion of the zirconium oxide fine particles (D-2) was diluted with 12.77 mL of water to obtain an aqueous dispersion of the zirconium oxide fine particles (D-2).

Step (i):

301 mg of the compound (B-3) was added to the container, and 5 mL of MEK was introduced to dissolve it, and then 861 μL of the component (f2-2), 86 μL of the compound (f2-3) and 17 mg of the photopolymerization initiator (G-1) were introduced thereto. The interior of the container was replaced by $N_2$ gas, and then an ultraviolet ray having a main wavelength of 365 nm was irradiated for 3 hours with an output power of 10 mW. MEK was introduced to the container to make 20 mL, and then a solution of surface modifier (C-11) was obtained.

Step (ii):

The aqueous dispersion of the zirconium oxide fine particles (D-2) and the solution of the surface modifier (C-11) were stirred, mixed and left to stand still. Then, the mixed solution was separated into two phases, and the upper phase became MEK phase and the lower phase became water phase. A portion of the water phase was collected and dried to measure its dry mass, but the residue was not found. The MEK phase was collected and then 10 mL of hexane was introduced to carry out stirring, followed by removing water found at the bottom of the container to obtain an extract of surface-modified inorganic fine particles (E-11).

Step (iii):

The extract of the surface-modified inorganic fine particles (E-11) was concentrated under reduced pressure, and 164 μL of the component (f2-2) and 16 μL of the component (f2-3) were introduced in a half way, and then further concentrated under reduced pressure to remove the solvent, to obtain a semitransparent viscous liquid. 3 mg of the photopolymerization initiator (G-1) was added to obtain photocurable material (11). The mass % of the zirconium oxide fine particles (D-2) in the photocurable material (11) was found to be 60 mass %, when it was calculated on an assumption that the total amount of the zirconium oxide fine particles (D-2) was transferred to the MEK phase in the step (ii).

The proportions of the starting materials charged in Example 11 were shown in Table 1.

With respect to the photocurable material (11), various evaluations were carried out. The results are shown in Table 2. By the results shown in Table 2, it was confirmed that the zirconium oxide fine particles (D-2) were dispersed in the photocurable material (11) without being agglomerated.

TABLE 1

| | Molar ratio of (A)/(B) | Mass ratio of (D)/(B) | Mass % in 100 mass % of (A) + (B) + (D) + (F) + (G) | | | | Mass ratio of (A)/(F) |
|---|---|---|---|---|---|---|---|
| | | | (A) + (F) | (B) | (D) | (G) | |
| Ex. 1 | 1.34 | 3.32 | 57.3 | 9.6 | 31.9 | 1.2 | 0.55 |
| Ex. 2 | 1.34 | 4.15 | 53.1 | 8.9 | 37.0 | 1.0 | 0.55 |
| Ex. 3 | — | 2.71 ((D)/(I)) | — | — | — | — | — |
| Ex. 4 | 0 | 3.32 | — | — | — | — | — |
| Ex. 5 | 1.10 ((J)/(B)) | 3.32 | — | — | — | — | — |
| Ex. 7 | 1.41 | 4.25 | 60.1 | 6.6 | 32.0 | 1.3 | 0.55 |
| Ex. 8 | 1.47 | 5.60 | 56.4 | 5.6 | 37.0 | 1.0 | 0.55 |
| Ex. 9 | 0.57 | 7.28 | 17.0 | 9.6 | 73.0 | 0.4 | 8 |
| Ex. 10 | 1.00 | 9.97 | 33.6 | 6.0 | 60.0 | 0.4 | 5.24 |
| Ex. 11 | 1.01 | 9.97 | 33.6 | 6.0 | 60.0 | 0.4 | 5.26 |

TABLE 2

|  | Refractive index (nD) | Transmittance (400 nm) [%] | Haze [%] | Sensitivity [mJ/cm²] | Contact angle [degree] |
|---|---|---|---|---|---|
| Ex. 1 | 1.595 | 91 | 0.4 | 441 | 78 |
| Ex. 2 | 1.542 | 91 | 0.6 | 441 | 81 |
| Ex. 3 | — | — | — | — | — |
| Ex. 4 | — | — | — | — | — |
| Ex. 5 | — | — | — | — | — |
| Ex. 7 | 1.592 | 91 | 0.4 | 720 | 81 |
| Ex. 8 | 1.542 | 91 | 0.6 | 441 | 83 |
| Ex. 9 | 1.666 | 90 | 1.0 | 680 | 79 |
| Ex. 10 | 1.550 | 92 | 0.7 | 590 | 108 |
| Ex. 11 | 1.551 | 92 | 0.7 | 590 | 105 |

INDUSTRIAL APPLICABILITY

The article obtained by using the photocurable material of the present invention is useful as an optical element such as a microlens array, an optical waveguide element, an optical switching element (such as a grid polarizing element or a wavelength plate), a Fresnel zone plate element, a binary element, a Blaise element or a Photonic crystal, as an antireflection component, or as a replica mold for production.

The entire disclosures of Japanese Patent Application No. 2008-318895 filed on Dec. 15, 2008 and Japanese Patent Application No. 2009-157257 filed on Jul. 1, 2009 including specifications, claims, drawings and summaries are incorporated herein by reference in their entireties.

REFERENCE SYMBOLS

20: Photocurable material
30: Substrate
40: Molded product (article)
42: Cured product (cured film)

What is claimed is:

1. A process for producing a photocurable material, which comprises the following steps (i) to (iii):
   (i) a step of reacting a polymerizable component (A) comprised of at least one type of a compound (a) having a (meth)acryloyloxy group, and a compound (B) having a mercapto group and a carboxy group to obtain a surface modifier (C) which has the carboxy group derived from the compound (B) at a terminal,
   (ii) a step of modifying the surface of inorganic fine particles (D) with the surface modifier (C) to obtain surface-modified inorganic fine particles (E),
   (iii) a step of obtaining a photocurable material which contains the surface-modified inorganic fine particles (E), a polymerizable component (F) comprised of at least one type of a compound (f) having a (meth)acryloyloxy group, and a photopolymerization initiator (G).

2. The process for producing a photocurable material according to claim 1, wherein in the step (i), the molar amount of the polymerizable component (A) is from 0.5 to 10 times of the molar amount of the compound (B).

3. The process for producing a photocurable material according to claim 1, wherein in the step (ii), the mass of the inorganic fine particles (D) is from 0.2 to 10 times of the mass of the compound (B) used in the step (i).

4. The process for producing a photocurable material according to claim 1, wherein in the total (100 mass %) of the polymerizable component (A), the compound (B), the inorganic fine particles (D), the polymerizable component (F) and the photopolymerization initiator (G), the total of the polymerizable component (A) and the polymerizable component (F) is from 10 to 98.8 mass %, the compound (B) is from 0.01 to 28 mass %, the inorganic fine particles (D) are from 0.1 to 75 mass % and the photopolymerization initiator (G) is from 0.1 to 9 mass %, as represented by the proportions of the starting materials charged.

5. The process for producing a photocurable material according to claim 1, wherein the compound (B) has a pKa of at most 4.4.

6. The process for producing a photocurable material according to claim 1, wherein the compound (B) satisfies the following conditions (1) to (3):
   condition (1): having at least one mercapto group;
   condition (2): having at least one carboxy group;
   condition (3): having no primary amino group.

7. The process for producing a photocurable material according to claim 1, wherein the compound (B) is a compound which is a $C_{2-20}$ aliphatic carboxylic acid, and has a mercapto group at least at any one of the α-, β- and γ-positions to the carboxy group, and no primary amino group.

8. The process for producing a photocurable material according to claim 1, wherein the compound (B) has a molecular weight of at most 600.

9. The process for producing a photocurable material according to claim 1, wherein the inorganic fine particles (D) are fine particles of a metal oxide.

10. The process for producing a photocurable material according to claim 9, wherein the metal oxide is at least one member selected from the group consisting of titanium oxide, zirconium oxide, aluminum oxide, barium titanate, cerium oxide, tin oxide, zinc oxide, tantalum oxide, manganese oxide, nickel oxide, iron oxide, silicon oxide, niobium oxide, lanthanum oxide and gadolinium oxide.

11. The process for producing a photocurable material according to claim 1, wherein the inorganic fine particles (D) have an average primary particle size of from 2 to 100 nm.

12. The process for producing a photocurable material according to claim 1, wherein the polymerizable component (F) contains a compound having fluorine atoms and at least one (meth)acryloyloxy group.

13. The process for producing a photocurable material according to claim 1, wherein the polymerizable component (F) contains a compound (f1) having at least two (meth)acryloyloxy groups (provided that the compound (f2) is excluded), the compound (f2) having fluorine atoms and at least one (meth)acryloyloxy group, and a compound (f3) having one (meth)acryloyloxy group (provided that the compound (f2) is excluded); and in the total (100 mass %) of the compound (f1), the compound (f2) and the compound (f3), the compound (f1) is from 15 to 70 mass %, the compound (f2) is from 5 to 45 mass % and the compound (f3) is from 10 to 65 mass %.

14. The process for producing a photocurable material according to claim 1, wherein the polymerizable component (A) is comprised of at least one type of the compound (f) constituting the polymerizable component (F).

15. The process for producing a photocurable material according to claim 14, wherein the polymerizable component (A) is a polymerizable component identical to the polymerizable component (F).

* * * * *